(12) United States Patent
Ly et al.

(10) Patent No.: US 12,284,648 B2
(45) Date of Patent: Apr. 22, 2025

(54) DYNAMIC NETWORK-SIDE ANTENNA ADAPTATION FOR SEMI-PERSISTENT SCHEDULING DOWNLINK TRAFFIC

(71) Applicant: QUALCOMM Incorporated, San Diego, CA (US)

(72) Inventors: Hung Dinh Ly, San Diego, CA (US); Muhammad Sayed Khairy Abdelghaffar, San Jose, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 496 days.

(21) Appl. No.: 17/648,999

(22) Filed: Jan. 26, 2022

(65) Prior Publication Data

US 2023/0239872 A1     Jul. 27, 2023

(51) Int. Cl.
*H04W 72/1273*     (2023.01)
(52) U.S. Cl.
CPC ............................. *H04W 72/1273* (2013.01)
(58) Field of Classification Search
CPC ............ H04W 72/1273; H04W 72/232; H04B 7/0691
See application file for complete search history.

(56) References Cited

U.S. PATENT DOCUMENTS

| 2019/0320469 | A1 | 10/2019 | Huang et al. | |
| 2020/0100252 | A1* | 3/2020 | Li | H04W 72/04 |
| 2020/0396684 | A1* | 12/2020 | Lin | H04W 52/0238 |
| 2021/0184812 | A1 | 6/2021 | Molavianjazi et al. | |
| 2021/0212101 | A1 | 7/2021 | Jiang et al. | |
| 2021/0352580 | A1* | 11/2021 | Zhou | H04B 7/0413 |
| 2023/0337029 | A1* | 10/2023 | Tang | H04W 24/10 |
| 2024/0098752 | A1* | 3/2024 | Chen | H04W 52/0206 |

FOREIGN PATENT DOCUMENTS

WO    WO-2021174238 A2    9/2021

OTHER PUBLICATIONS

Chochliouros et al., "Energy Efficiency Concerns and Trends in Future 5G Network Infrastructures," Energies 2021, vol. 14, https://doi.org/10.3390/en14175392, 14 pages.
Hatt et al., "5G Energy Efficiencies—Green is the New Black," GSMA Intelligence, Nov. 2020, 26 pages.
International Search Report and Written Opinion—PCT/US2023/060545—ISA/EPO—Apr. 5, 2023.

* cited by examiner

*Primary Examiner* — Sharmin Chowdhury
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, downlink control information (DCI) that includes a semi-persistent scheduling (SPS) activation indication. The UE may receive, from the network node, an SPS physical downlink shared channel (PDSCH) based at least in part on the SPS activation indication, wherein the SPS PDSCH is associated with one or more transmission parameters that are based at least in part on an antenna adaptation configuration applicable to the SPS PDSCH. Numerous other aspects are described.

30 Claims, 13 Drawing Sheets

DYNAMIC NETWORK-SIDE ANTENNA ADAPTATION FOR SEMI-PERSISTENT SCHEDULING DOWNLINK TRAFFIC

FIELD OF THE DISCLOSURE

Aspects of the present disclosure generally relate to wireless communication and to techniques and apparatuses for dynamic network-side antenna adaptation for semi-persistent scheduling (SPS) downlink traffic.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive, from a network node, downlink control information (DCI) that includes a semi-persistent scheduling (SPS) activation indication. The one or more processors may be configured to receive, from the network node, an SPS physical downlink shared channel (PDSCH) based at least in part on the SPS activation indication, wherein the SPS PDSCH is associated with one or more transmission parameters that are based at least in part on an antenna adaptation configuration applicable to the SPS PDSCH.

Some aspects described herein relate to a network node for wireless communication. The network node may include a memory and one or more processors coupled to the memory. The one or more processors may be configured to transmit, to a UE, DCI that includes an SPS activation indication. The one or more processors may be configured to transmit, to the UE, an SPS PDSCH based at least in part on the SPS activation indication, wherein the SPS PDSCH is associated with one or more transmission parameters that are based at least in part on an antenna adaptation configuration applicable to the SPS PDSCH.

Some aspects described herein relate to a method of wireless communication performed by a UE. The method may include receiving, from a network node, DCI that includes an SPS activation indication. The method may include receiving, from the network node, an SPS PDSCH based at least in part on the SPS activation indication, wherein the SPS PDSCH is associated with one or more transmission parameters that are based at least in part on an antenna adaptation configuration applicable to the SPS PDSCH.

Some aspects described herein relate to a method of wireless communication performed by a network node. The method may include transmitting, to a UE, DCI that includes an SPS activation indication. The method may include transmitting, to the UE, an SPS PDSCH based at least in part on the SPS activation indication, wherein the SPS PDSCH is associated with one or more transmission parameters that are based at least in part on an antenna adaptation configuration applicable to the SPS PDSCH.

Some aspects described herein relate to a non-transitory computer-readable medium that stores a set of instructions for wireless communication by a UE. The set of instructions, when executed by one or more processors of the UE, may cause the UE to receive, from a network node, DCI that includes an SPS activation indication. The set of instructions, when executed by one or more processors of the UE, may cause the UE to receive, from the network node, an SPS PDSCH based at least in part on the SPS activation indication, wherein the SPS PDSCH is associated with one or more transmission parameters that are based at least in part on an antenna adaptation configuration applicable to the SPS PDSCH.

Some aspects described herein relate to a non-transitory computer-readable medium that stores a set of instructions for wireless communication by a network node. The set of instructions, when executed by one or more processors of the network node, may cause the network node to transmit, to a UE, DCI that includes an SPS activation indication. The set of instructions, when executed by one or more processors of the network node, may cause the network node to transmit, to the UE, an SPS PDSCH based at least in part on the SPS activation indication, wherein the SPS PDSCH is associated with one or more transmission parameters that are based at least in part on an antenna adaptation configuration applicable to the SPS PDSCH.

Some aspects described herein relate to an apparatus for wireless communication. The apparatus may include means for receiving, from a network node, DCI that includes an SPS activation indication. The apparatus may include means for receiving, from the network node, an SPS PDSCH based at least in part on the SPS activation indication, wherein the SPS PDSCH is associated with one or more transmission parameters that are based at least in part on an antenna adaptation configuration applicable to the SPS PDSCH.

Some aspects described herein relate to an apparatus for wireless communication. The apparatus may include means for transmitting, to a UE, DCI that includes an SPS activation indication. The apparatus may include means for transmitting, to the UE, an SPS PDSCH based at least in part on the SPS activation indication, wherein the SPS PDSCH is associated with one or more transmission parameters that are based at least in part on an antenna adaptation configuration applicable to the SPS PDSCH.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
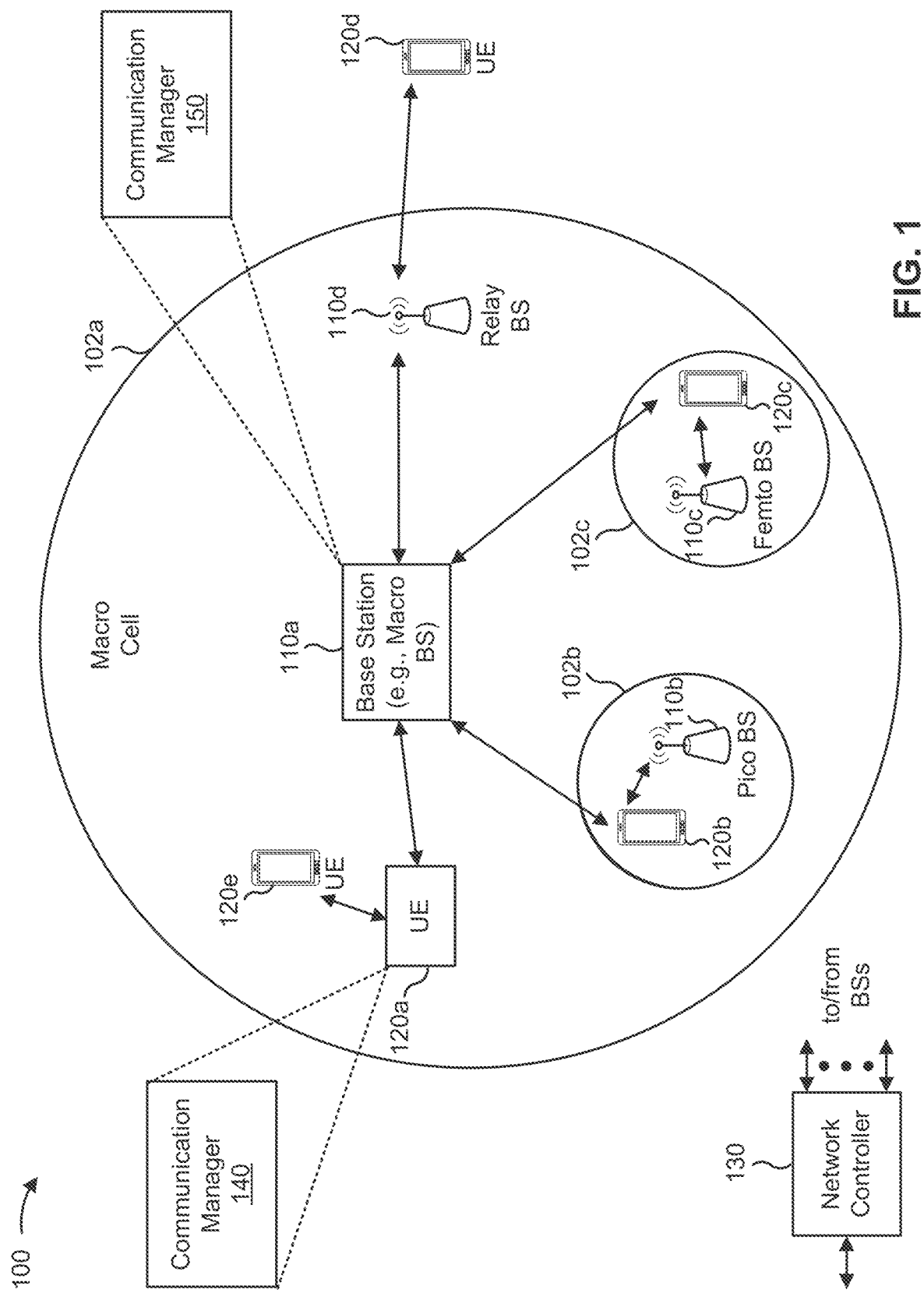
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node (e.g., a base station 110), downlink control information (DCI) that includes a semi-persistent scheduling (SPS) activation indication; and receive, from the network node, an SPS physical downlink shared channel (PDSCH) based at least in part on the SPS activation indication, wherein the SPS PDSCH is associated with one or more transmission parameters that are based at least in part on an antenna adaptation configuration applicable to the SPS PDSCH. Additionally, or alternatively, the communication manager 140 may perform one or more other operations described herein.

In some aspects, a network node (e.g., a base station 110) may include a communication manager 150. As described in more detail elsewhere herein, the communication manager 150 may transmit, to a UE 120, DCI that includes an SPS activation indication; and transmit, to the UE 120, an SPS PDSCH based at least in part on the SPS activation indication, wherein the SPS PDSCH is associated with one or more transmission parameters that are based at least in part on an antenna adaptation configuration applicable to the SPS PDSCH. Additionally, or alternatively, the communication manager 150 may perform one or more other operations described herein.

As used herein, the term "network node" may refer to any UE, base station, apparatus, device, or computing system configured to perform any techniques described herein. For example, a network node may be a UE. As another example, a network node may be a base station. As another example, a first network node may be configured to communicate with a second network node or a third network node. In one aspect of this example, the first network node may be a UE and the second network node may be a base station. Similarly, a third network node may be a UE, a base station, or another device. In some aspects of this example, first, second, and third network nodes may be the same type of device or different types of devices. Similarly, reference to a UE, base station, apparatus, device, or computing system may include disclosure of the UE, base station, apparatus, device, or computing system being a network node. For example, disclosure that a UE is configured to receive information from a base station also discloses that a first network node is configured to receive information from a second network node. In this example, consistent with this disclosure, "first network node" may refer to a first UE, a first base station, a first apparatus, a first device, or a first computing system configured to receive the information; and "second network node" may refer to a second UE, a second base station, a second apparatus, a second device, or a second computing system.

As indicated above, FIG. 1 is provided as an example. Other examples may differ from what is described with regard to FIG. 1.

Figure 2:
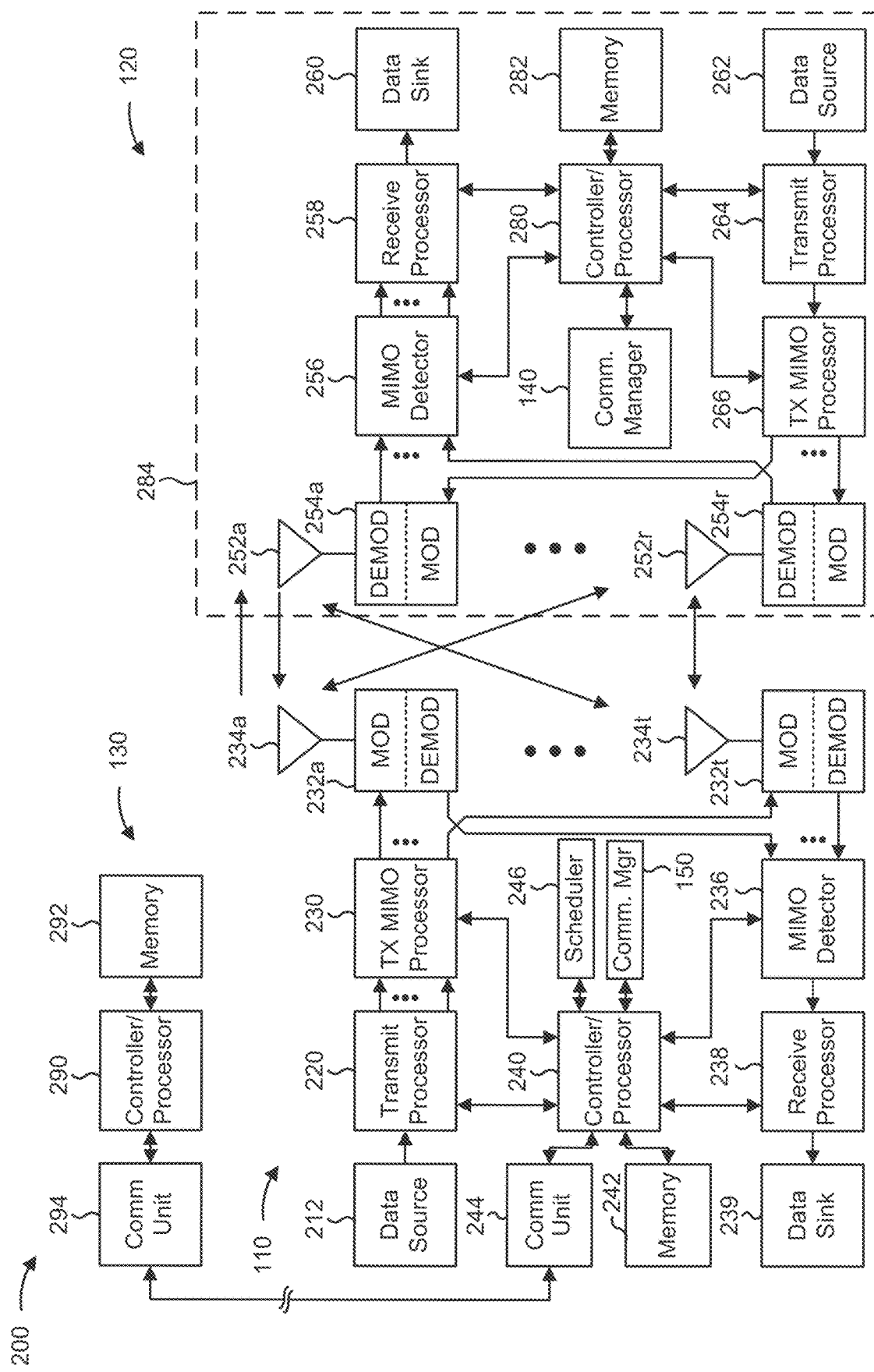
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

As described herein, the term "base station" (e.g., the base station 110) may refer to an aggregated base station, a disaggregated base station, and/or one or more components of a disaggregated base station. For example, in some aspects, "base station" may refer to a control unit (CU), a distributed unit (DU), a radio unit (which may additionally, or alternatively, be referred to as a relay unit or a repeater unit) (RU), multiple CUs, multiple DUs, multiple RUs, and/or any suitable combination thereof. In some aspects, "base station" may refer to one device configured to perform one or more functions described herein in connection with the base station 110. In some aspects, "base station" may refer to multiple devices configured to perform one or more functions described herein in connection with the base station 110. For example, in some distributed systems, each of several different devices (which may be located in the same geographic location or in different geographic locations) may be configured to perform at least a portion of a function of the base station 110, or to duplicate performance of at least a portion of a function the base station 110, and the term "base station" may refer to any one or more of such devices. In some aspects, "base station" may refer to one or more virtual base stations, one or more virtual base station functions, and/or a combination of thereof. For example, in some cases, two or more base station functions may be instantiated on a single device. In some aspects, "base station" may refer to one of the base station functions and not another. In this way, a single device may include more than one base station and/or a single base station may include more than one device.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the base station 110, the controller/processor 280 of the UE 120, and/or any other component(s) of FIG. 2 may perform one or more techniques associated with dynamic network-side antenna adaptation for semi-persistent scheduling (SPS) downlink traffic, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving, from a network node (e.g., base station 110), downlink control information (DCI) that includes an SPS activation indication; and/or means for receiving, from the network node, an SPS PDSCH based at least in part on the SPS activation indication, wherein the SPS PDSCH is associated with one or more transmission parameters that are based at least in part on an antenna adaptation configuration applicable to the SPS PDSCH. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node (e.g., base station 110) includes means for transmitting, to the UE 120, DCI that includes an SPS activation indication; and/or means for transmitting, to the UE 120, an SPS PDSCH based at least in part on the SPS activation indication, wherein the SPS PDSCH is associated with one or more transmission parameters that are based at least in part on an antenna adaptation configuration applicable to the SPS PDSCH. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
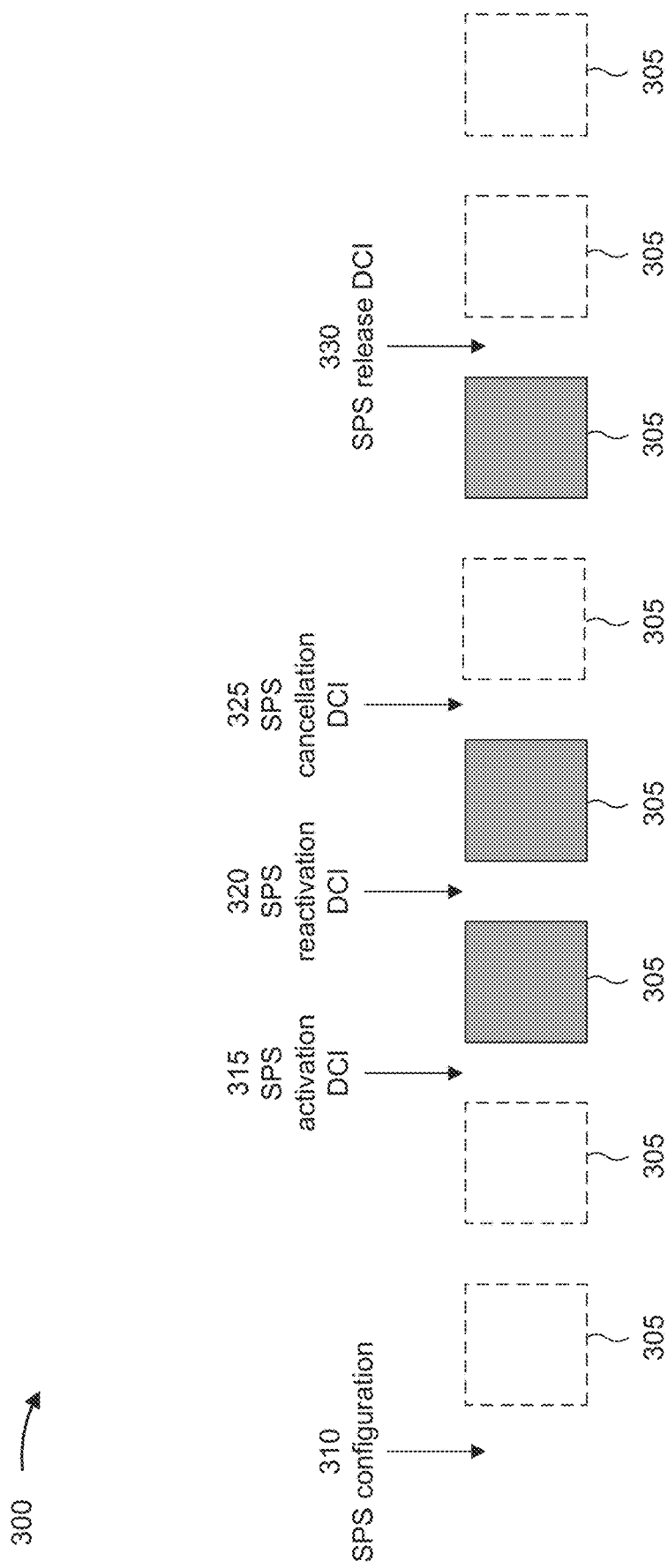
FIG. 3 is a diagram illustrating an example of downlink semi-persistent scheduling (SPS) communication, in accordance with the present disclosure.

FIG. 3 is a diagram illustrating an example 300 of downlink SPS communication, in accordance with the present disclosure. SPS communications may include periodic downlink communications that are configured for a UE in periodically recurring scheduled SPS occasions 305, such that a base station does not need to send separate DCI to the UE to schedule each downlink communication, thereby conserving signaling overhead.

As shown by reference number 310, a UE may receive, from a base station, an SPS configuration for SPS communications. For example, the UE may receive the SPS configuration via a radio resource control (RRC) message transmitted by the base station. The SPS configuration may indicate a resource allocation associated with SPS downlink communications (e.g., in a time domain, a frequency domain, a spatial domain, and/or a code domain) and a periodicity at which the resource allocation is repeated, resulting in the periodically recurring scheduled SPS occasions 305 for the UE. The SPS configuration may also configure hybrid automatic repeat request (HARD)-acknowledgement (ACK) (HARQ-ACK) feedback resources for the UE to transmit HARQ-ACK feedback for SPS physical downlink shared channel (PDSCH) communications received in the SPS occasions 305. For example, the SPS configuration may indicate a PDSCH-to-HARQ feedback timing value, which may be referred to as a K1 value in a wireless communication standard (e.g., a 3GPP standard).

As shown by reference number 315, the base station may transmit SPS activation DCI (e.g., DCI carrying an SPS activation indication) to the UE to activate the SPS configuration for the UE. For example, the SPS activation DCI may include a cyclic redundancy check (CRC) scrambled by a configured scheduling radio network temporary identity (CS-RNTI) associated with the SPS configuration of the UE. The base station may indicate, in the SPS activation DCI, transmission parameters, such as an MCS, a resource block (RB) allocation, and/or antenna ports (e.g., a number of antenna ports for a PDSCH DMRS), for the SPS PDSCH communications to be transmitted in the scheduled SPS occasions 305. The UE may begin monitoring the SPS occasions 305 based at least in part on receiving the SPS activation DCI with the CRC scrambled by the CS-RNTI associated with the SPS configuration of the UE. For example, beginning with a next scheduled SPS occasion 305 subsequent to the SPS activation DCI, the UE may monitor the scheduled SPS occasions 305 to decode PDSCH communications using the transmission parameters indicated in the SPS activation DCI. The UE may refrain from monitoring configured SPS occasions 305 prior to receiving the SPS activation DCI. Furthermore, the base station does not need to transmit, and therefore may refrain from transmitting, a physical downlink control channel (PDCCH) for each SPS PDSCH that is transmitted in an SPS occasion 305 after the SPS activation DCI.

As shown by reference number 320, the base station may transmit SPS reactivation DCI to the UE to change the transmission parameters for the SPS PDSCH communications. Based at least in part on receiving the SPS reactivation DCI, the UE may begin monitoring the scheduled SPS occasions 305 using the transmission parameters indicated in the SPS reactivation DCI. For example, beginning with a next scheduled SPS occasion 305 subsequent to receiving the SPS reactivation DCI, the UE may monitor the scheduled SPS occasions 305 to decode PDSCH communications based on the transmission parameters indicated in the SPS reactivation DCI.

In some cases, as shown by reference number 325, such as when the base station does not have downlink traffic to transmit to the UE, the base station may transmit SPS cancellation DCI to the UE to temporarily cancel or deactivate one or more subsequent SPS occasions 305 for the UE. The SPS cancellation DCI may deactivate only a subsequent one SPS occasion 305 or a subsequent N SPS occasions 305 (where N is an integer). SPS occasions 305 after the one or more (e.g., N) SPS occasions 305 subsequent to the SPS cancellation DCI may remain activated. Based at least in part on receiving the SPS cancellation DCI, the UE may refrain from monitoring the one or more (e.g., N) SPS occasions 305 subsequent to receiving the SPS cancellation DCI. As shown in example 300, the SPS cancellation DCI cancels one (1) subsequent SPS occasion 305 for the UE. After the SPS occasion 305 (or N SPS occasions) subsequent to receiving the SPS cancellation DCI, the UE may automatically resume monitoring the scheduled SPS occasions 305.

As shown by reference number 330, the base station may transmit SPS release DCI to the UE to deactivate the SPS configuration for the UE. The UE may stop monitoring the scheduled SPS occasions 305 based at least in part on receiving the SPS release DCI. For example, the UE may refrain from monitoring any scheduled SPS occasions 305 until another SPS activation DCI is received from the base station. Whereas the SPS cancellation DCI may deactivate only a subsequent one SPS occasion 305 or a subsequent N SPS occasions 305, the SPS release DCI deactivates all subsequent SPS occasions 305 for a given SPS configuration for the UE until the given SPS configuration is activated again by a new SPS activation DCI.

As indicated above, FIG. 3 is provided as an example. Other examples may differ from what is described with regard to FIG. 3.

Figure 4:
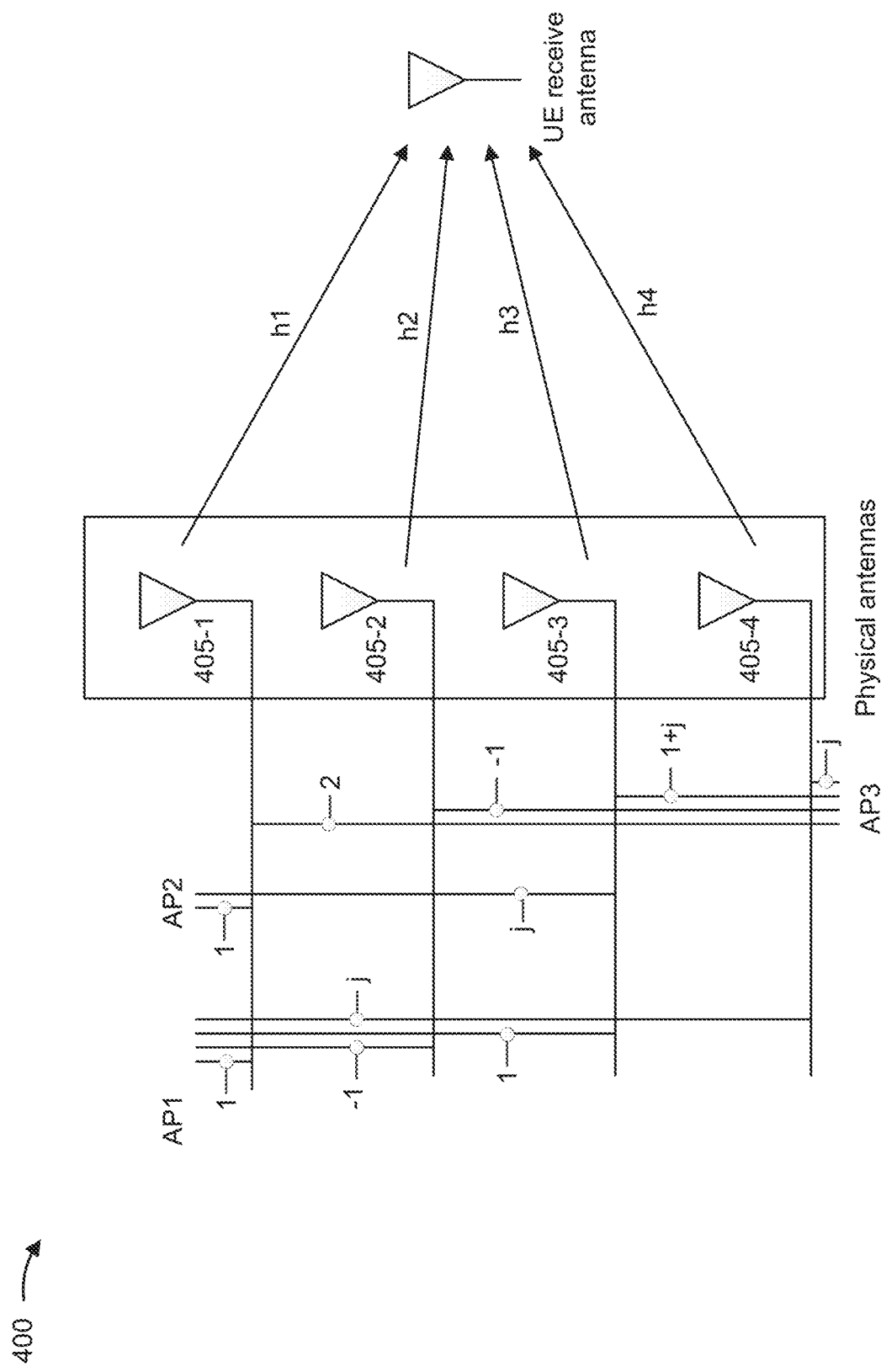
FIG. 4 is a diagram illustrating an example of antenna ports, in accordance with the present disclosure.

FIG. 4 is a diagram illustrating an example 400 of antenna ports, in accordance with the present disclosure.

As shown in FIG. 4, a first physical antenna 405-1 may transmit information via a first channel h1, a second physical antenna 405-2 may transmit information via a second channel h2, a third physical antenna 405-3 may transmit information via a third channel h3, and a fourth physical antenna 405-4 may transmit information via a fourth channel h4. Such information may be conveyed via a logical antenna port, which may represent some combination of the physical antennas and/or channels. In some cases, a UE 120 may not have knowledge of the channels associated with the physical antennas, and may only operate based on knowledge of the channels associated with antenna ports, as defined below.

An antenna port may be defined such that a channel, over which a symbol on the antenna port is conveyed, can be inferred from a channel over which another symbol on the same antenna port is conveyed. In example 400, a channel associated with antenna port 1 (AP1) is represented as h1−h2+h3+j*h4, where channel coefficients (e.g., 1, −1, 1, and j, in this case) represent weighting factors (e.g., indicating phase and/or gain) applied to each channel. Such weighting factors may be applied to the channels to improve signal power and/or signal quality at one or more receivers. Applying such weighting factors to channel transmissions may be referred to as precoding, and a precoder may refer to a specific set of weighting factors applied to a set of channels.

Similarly, a channel associated with antenna port 2 (AP2) is represented as h1+j*h3, and a channel associated with antenna port 3 (AP3) is represented as 2*h1−h2+(1+j)*h3+j*h4. In this case, antenna port 3 can be represented as the sum of antenna port 1 and antenna port 2 (e.g., AP3=AP1+AP2) because the sum of the expression representing antenna port 1 (h1−h2+h3+j*h4) and the expression representing antenna port 2 (h1+j*h3) equals the expression representing antenna port 3 (2*h1−h2+(1+j)*h3+j*h4). It can also be said that antenna port 3 is related to antenna ports 1 and 2 [AP1,AP2] via the precoder [1,1] because 1 times the expression representing antenna port 1 plus 1 times the expression representing antenna port 2 equals the expression representing antenna port 3.

As indicated above, FIG. 4 is provided as an example. Other examples may differ from what is described with regard to FIG. 4.

Figure 5:
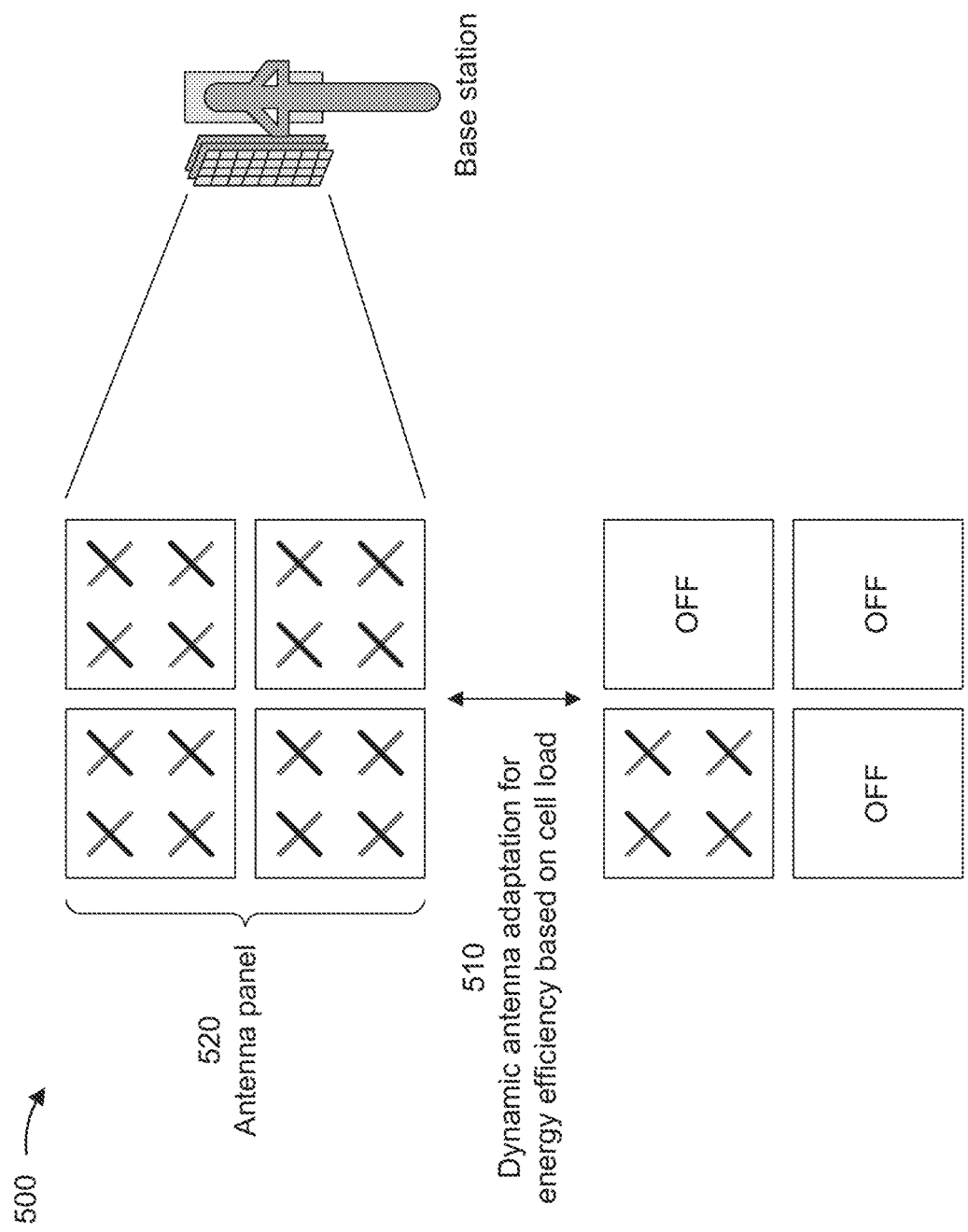
FIG. 5 is a diagram illustrating an example of dynamic network-side antenna adaptation, in accordance with the present disclosure.

FIG. 5 is a diagram illustrating an example 500 of dynamic network-side antenna adaptation, in accordance with the present disclosure.

For various reasons, including climate change mitigation and network cost reduction, energy-saving and/or energy efficiency measures are expected to have increasing importance in wireless network operations. For example, although NR generally offers a significant energy-efficiency improvement per gigabyte over previous generations (e.g., LTE), new NR use cases and/or the adoption of millimeter wave frequencies require more network sites and more network antennas, which could potentially lead to a more efficient cellular network that nonetheless has higher energy requirements and/or causes more emissions than previous generations. Furthermore, energy accounts for a significant portion of the cost to operate a cellular network. For example, according to some estimates, energy costs are nearly 23% of the total cost to operate a cellular network, with selling, general, and administrative (SG&A) expenses and other costs accounting for about 75%, and over 90% of network operating costs are spent on energy (e.g., fuel and electricity consumption). Most energy consumption and/or energy costs are associated with powering a radio access network (RAN), which accounts for about 50% of the energy consumed by a wireless network, with data centers and fiber transport accounting for smaller shares. Accordingly, measures to increase energy savings and/or energy efficiency in a wireless network are important factors that may drive adoption and/or expansion of cellular networks.

One way to increase energy efficiency in a RAN may be to use dynamic antenna adaptation in a base station that communicates using massive MIMO technology, which tends to consume significant power. For example, in an LTE network, a base station that supports massive MIMO technology may communicate using a baseband unit (BBU) that processes baseband signals and communicates with a core network through a physical interface and a remote radio unit (RRU) that performs transmit and receive radio frequency (RF) functions. In an LTE network, the per-cell power consumption (e.g., in watts) is slightly larger for the RRU compared to the BBU, and the per-cell power consumption does not vary significantly with cell load. In an NR network, however, a base station that supports massive MIMO technology may communicate using a BBU and an active antenna unit (AAU) that consumes significantly more power than the BBU and the RRU in an LTE base station (e.g., because NR operates at a higher data rate and/or a higher bandwidth than LTE). For example, the BBU and the AAU in an NR base station may consume 2.4 times the power of the BBU and RRU in an LTE base station when the cell load is low (e.g., 0%), 2.6 times the power of the BBU and RRU in an LTE base station when the cell load is moderate (e.g., 50%), or 3 times the power of the BBU and RRU in an LTE base station when the cell load is high (e.g., 100%), where "cell load" generally refers to the proportion of frequency resources within a carrier that are being utilized at a given time. Furthermore, in an NR base station, the AAU generally consumes more power than the BBU, and the proportion of power consumption attributable to the AAU increases as the cell loading increases (e.g., because the BBU has a relatively static power consumption regardless of cell loading). Accordingly, in an NR base station that supports massive MIMO technology, the AAU represents the most power-hungry component.

Accordingly, as shown in FIG. 5, and by reference number 510, a base station that supports massive MIMO communication may enable dynamic antenna adaptation based on a current and/or predicted cell load in order to improve energy efficiency. For example, to enable massive MIMO communication, a base station may generally need to have multiple co-located antenna panels that each include multiple antenna ports. For example, in FIG. 5, reference number 520 depicts an example antenna panel that includes four (4) sub-panels, each of which includes several antenna ports (shown as gray and black intersecting lines) that each map to one or more physical antennas, where each diagonal line in FIG. 5 corresponds to one (1) antenna port and a color of the diagonal line represents a polarization of the antenna port (e.g., horizontal or vertical). In general, each antenna panel is equipped with various power amplifiers and an antenna subsystem, which consume significant power. Accordingly, in order to save power or otherwise utilize energy more efficiently, the base station may dynamically adapt an antenna configuration based on a current and/or predicted cell load. For example, when the cell load is high, the base station may turn all (or most) antenna panels, sub-panels, and/or ports on to increase capacity, and the base station may turn off some antenna panels, sub-panels, and/or ports to reduce energy consumption when the cell load is low.

However, in cases where the base station supports dynamic antenna adaptation (e.g., to use energy more efficiently depending on cell load or other factors), the change in antenna configuration parameters may necessitate changing one or more PDSCH transmission parameters based on the current antenna configuration. For example, when the base station increases, decreases, or otherwise adapts the antenna panels, antenna sub-panels, and/or antenna ports that are active at a given time, the base station may need to adapt one or more PDSCH transmission parameters accordingly (e.g., a channel state information (CSI) report configuration, an SPS configuration, an MCS, or a number of antenna ports for a PDSCH DMRS, among other examples). The adaptation in the PDSCH transmission parameter(s) is generally not problematic for a dynamically scheduled PDSCH (e.g., a PDSCH that is dynamically scheduled by DCI), because the base station can indicate the adjusted PDSCH transmission parameter(s) in the scheduling DCI when the PDSCH antenna configuration is adapted. However, as described above with reference to FIG. 3, the base station generally does not transmit any PDCCH for an SPS PDSCH after the PDCCH that carries the SPS activation indication, whereby the base station may be unable to signal updated transmission parameters for the periodic SPS PDSCH transmissions. Accordingly, some aspects described herein relate to techniques and apparatuses to handle dynamic antenna adaptation in a context related to SPS PDSCH transmissions.

As indicated above, FIG. 5 is provided as an example. Other examples may differ from what is described with regard to FIG. 5.

Figure 6:
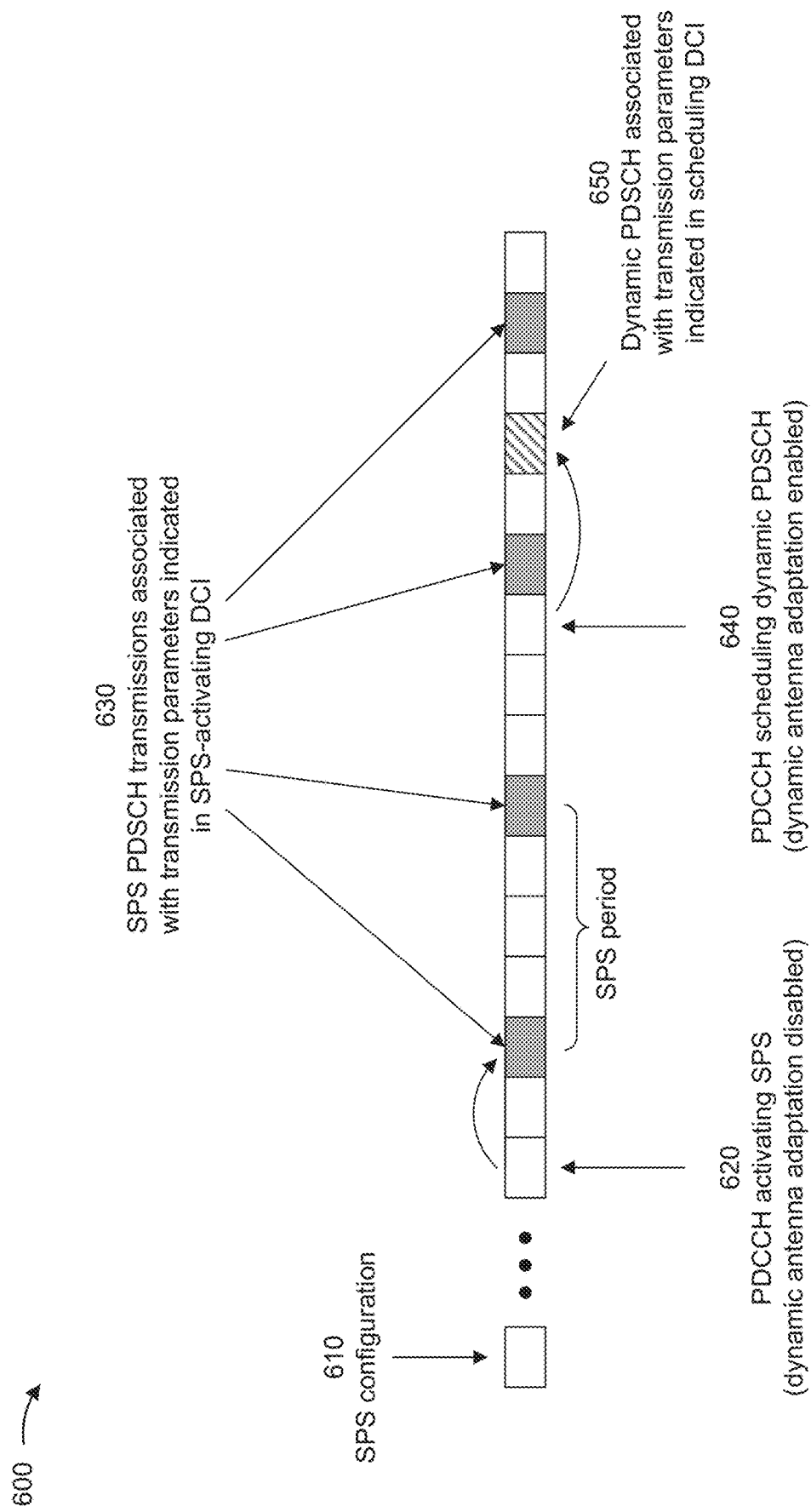
FIG. 6 is a diagram illustrating an example associated with handling dynamic network-side antenna adaptation with respect to SPS downlink traffic, in accordance with the present disclosure.

FIG. 6 is a diagram illustrating an example 600 associated with handling dynamic network-side antenna adaptation with respect to SPS downlink traffic, in accordance with the present disclosure. As described herein, SPS communications may include periodic SPS PDSCH communications that are configured for a UE in periodically recurring scheduled SPS occasions, such that a base station does not need to send separate DCI to the UE to schedule each SPS PDSCH.

For example, as shown by reference number 610, a UE may receive, from a base station, an SPS configuration for SPS communications. For example, the UE may receive the SPS configuration via an RRC message transmitted by the base station, which may indicate a resource allocation associated with SPS downlink communications, a periodicity at which the resource allocation is repeated, and/or other suitable SPS configuration information (e.g., a number of HARQ processes and/or a PDSCH-to-HARQ feedback timing value, among other examples).

As further shown in FIG. 6, and by reference number 620, the base station may transmit, and the UE may receive, a PDCCH carrying DCI that includes an SPS activation indication to activate the SPS configuration for the UE. For example, the DCI carrying the SPS activation indication may include a CRC scrambled by a CS-RNTI associated with the SPS configuration of the UE. The base station may indicate, in the SPS activation DCI, transmission parameters, such as a CSI report configuration (e.g., an antenna configuration included in a CSI report codebook configuration), an SPS configuration, an MCS, an RB allocation, and/or a number of antenna ports (e.g., for a PDSCH DMRS), for the SPS PDSCH communications to be transmitted in the scheduled SPS occasions (shown as gray boxes). The UE may begin to monitor the SPS occasions based on the SPS activation indication. For example, as shown, the SPS activation indication may point to a first SPS PDSCH occasion, and the UE may determine subsequent SPS PDSCH occasions based on the RRC-configured periodicity for the SPS configuration.

As shown in FIG. 6, the SPS configuration may be associated with an antenna adaptation configuration that disables dynamic antenna adaptation for the SPS PDSCH transmissions that occur after the DCI activating the SPS configuration. For example, in some aspects, the base station may be deployed in a wireless network where dynamic antenna adaptation is disabled for SPS PDSCH communications, or one or more wireless communication standards may specify that dynamic antenna adaptation is disabled for SPS PDSCH communications. Additionally, or alternatively, the UE may transmit capability information to the base station to indicate whether the UE supports dynamic antenna adaptation for SPS traffic, where the capability may be UE-specific (e.g., based on a configuration of the UE) or band-specific (e.g., the UE may have a capability to support dynamic antenna adaptation for SPS traffic in certain bands and may not support dynamic antenna adaptation for SPS traffic in other bands). In such cases, dynamic antenna adaptation may be disabled for SPS traffic based on the capability information provided by the UE (e.g., dynamic antenna adaptation may be disabled for SPS traffic based on the UE not supporting dynamic antenna adaptation for SPS and/or based on the UE and the base station communicating in a band in which the UE does not support dynamic antenna adaptation for SPS).

In general, when dynamic antenna adaptation is not enabled for SPS traffic, the UE does not expect dynamic antenna adaptation to be configured for any SPS PDSCH that is transmitted in an SPS occasion following the SPS activation indication. For example, as shown by reference number 630, the UE may monitor each scheduled SPS occasion, beginning with a next scheduled SPS occasion subsequent to the DCI carrying the SPS activation indication, to decode SPS PDSCH communications using the transmission parameters that were indicated in the SPS activation indication (e.g., a number of antenna ports, an MCS, and/or other scheduling information in the DCI triggering or otherwise activating the SPS configuration may be used to decode the SPS PDSCH communications). However, even in cases where dynamic antenna adaptation is not enabled for SPS traffic, dynamic antenna adaptation may be enabled for a dynamically scheduled PDSCH. For example, as shown by reference number 640, the base station may transmit, and the UE may receive, a PDCCH that includes DCI to schedule a dynamic PDSCH. In this case, the DCI scheduling the dynamic PDSCH may indicate one or more transmission parameters that are based on a dynamic antenna adaptation, such as an MCS or a number of antenna ports for the PDSCH scheduled by the DCI. Accordingly, as shown by reference number 650, the UE may receive the dynamically scheduled PDSCH based on the transmission parameters indicated in the scheduling DCI. In other words, in a wireless network where dynamic antenna adaptation is supported but dynamic antenna adaptation is not enabled for an SPS PDSCH (e.g., based on a wireless communication standard, a wireless network configuration, a UE capability, or other factors), dynamic antenna adaptation may be enabled only for dynamically scheduled PDSCH transmissions.

As indicated above, FIG. 6 is provided as an example. Other examples may differ from what is described with regard to FIG. 6.

Figure 7A:
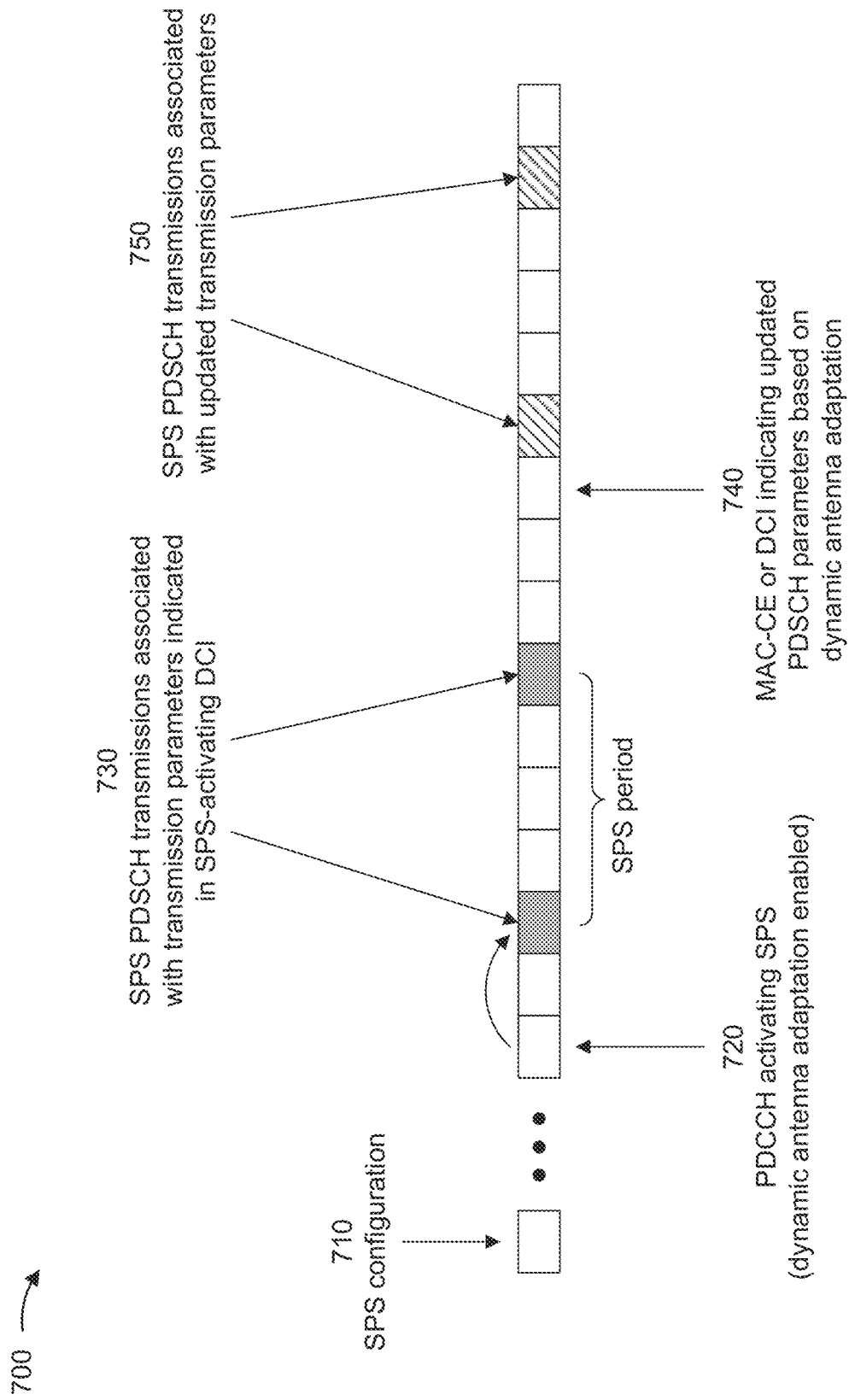
FIGS. 7A-7C are diagrams illustrating examples associated with handling dynamic network-side antenna adaptation with respect to SPS downlink traffic, in accordance with the present disclosure.
Figure 7B:
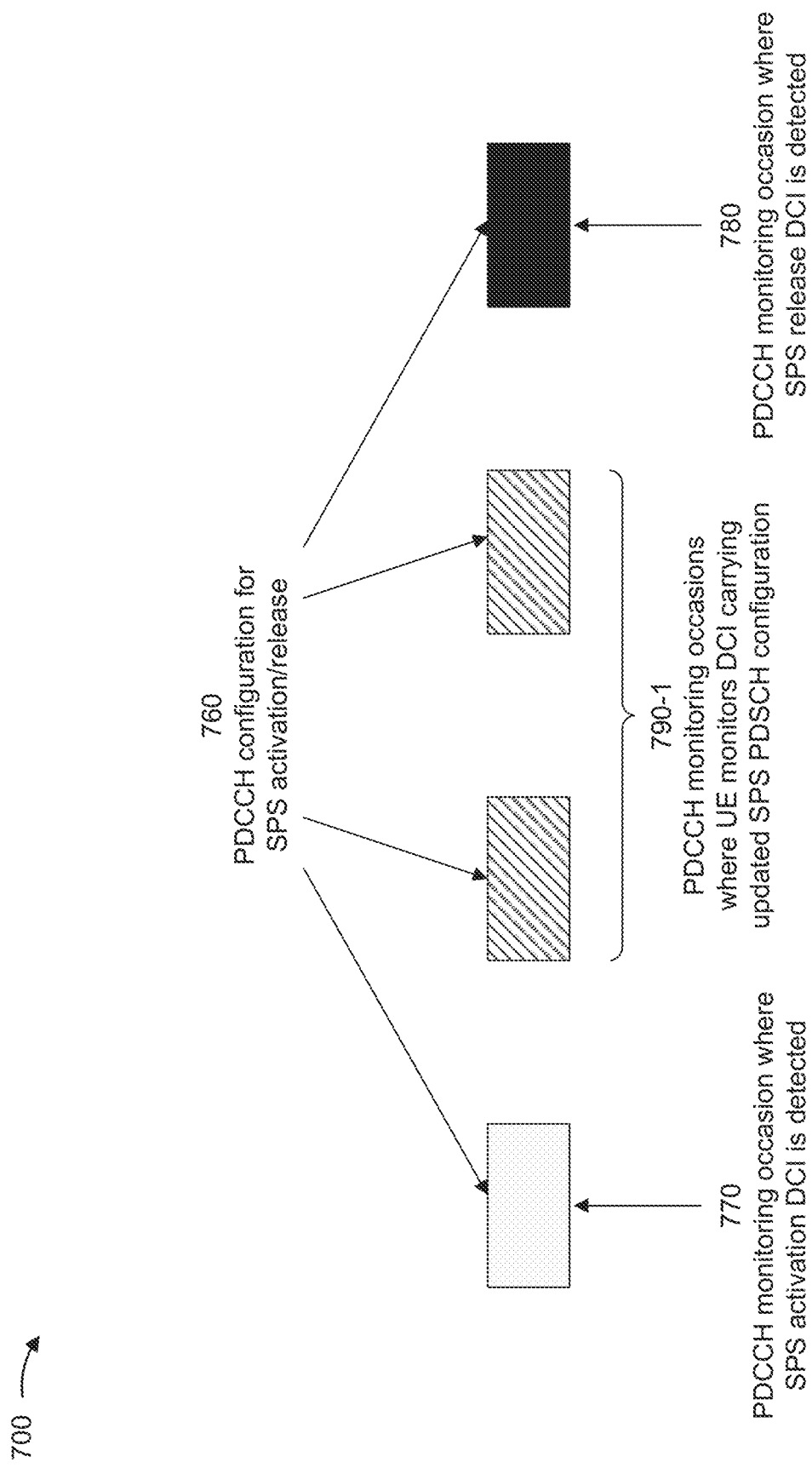
Figure 7C:
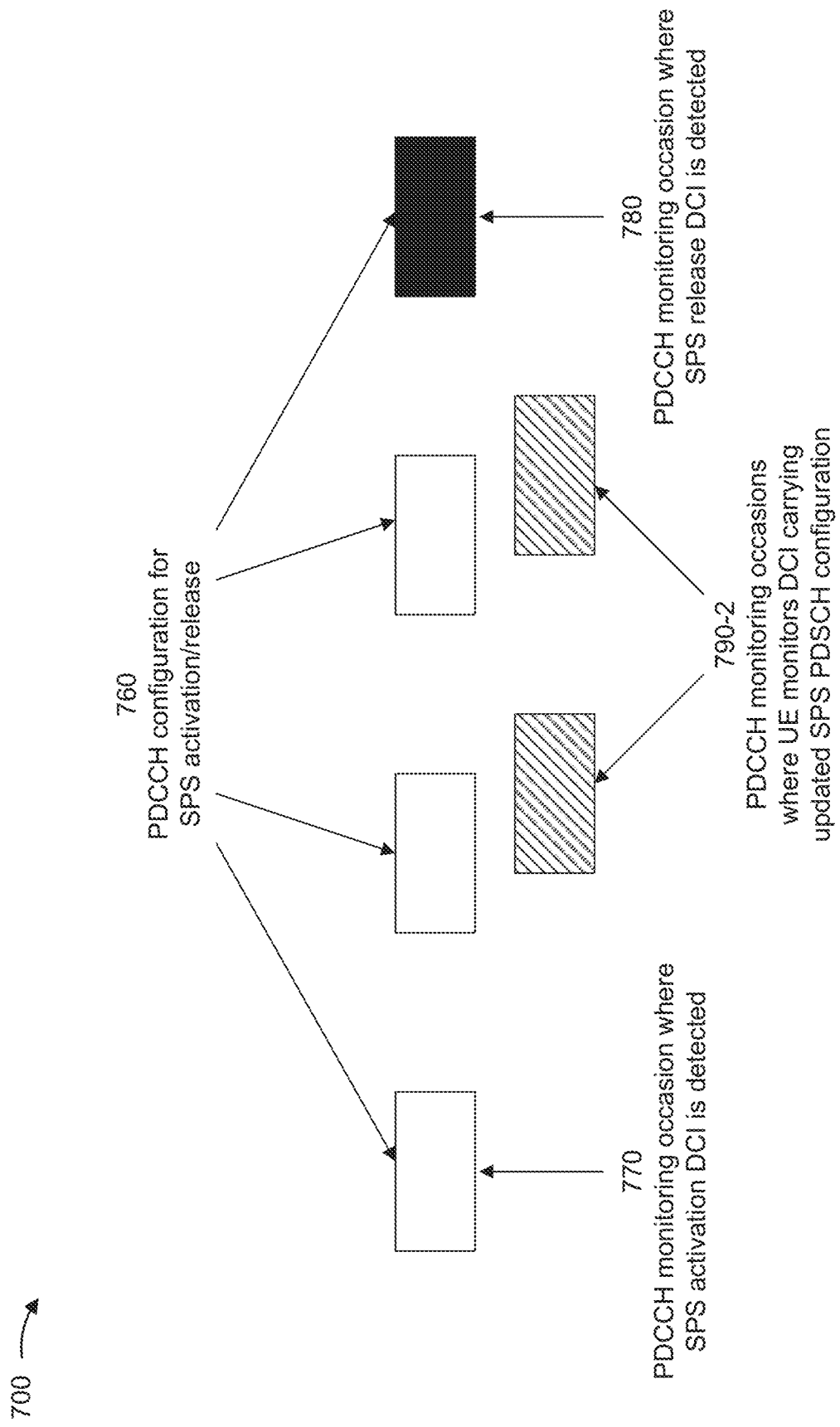

FIGS. 7A-7C are diagrams illustrating examples 700 associated with handling dynamic network-side antenna adaptation with respect to SPS downlink traffic, in accordance with the present disclosure. As described herein, SPS communications may include periodic SPS PDSCH communications that are configured for a UE in periodically recurring scheduled SPS occasions, such that a base station does not need to send separate DCI to the UE to schedule each SPS PDSCH.

For example, as shown by reference number 710, a UE may receive, from a base station, an SPS configuration for SPS communications. For example, the UE may receive the SPS configuration via an RRC message transmitted by the base station, which may indicate a resource allocation associated with SPS downlink communications, a periodicity at which the resource allocation is repeated, and/or other suitable SPS configuration information (e.g., a number of HARQ processes and/or a PDSCH-to-HARQ feedback timing value, among other examples).

As further shown in FIG. 7A, and by reference number 720, the base station may transmit, and the UE may receive, a PDCCH carrying DCI that includes an SPS activation indication to activate the SPS configuration for the UE. For example, the DCI carrying the SPS activation indication may include a CRC scrambled by a CS-RNTI associated with the SPS configuration of the UE. The base station may indicate, in the SPS activation DCI, transmission parameters, such as a CSI report configuration, an SPS configuration, an MCS, an RB allocation, and/or a number of antenna ports (e.g., for a PDSCH DMRS), for the SPS PDSCH communications to be transmitted in the scheduled SPS occasions (shown as gray boxes). The UE may begin to monitor the SPS occasions based on the SPS activation indication. For example, as shown, the SPS activation indication may point to a first SPS PDSCH occasion, and the UE may determine subsequent SPS PDSCH occasions based on the RRC-configured periodicity for the SPS configuration.

As shown in FIG. 7A, the SPS configuration may be associated with an antenna adaptation configuration that enables dynamic antenna adaptation for the SPS PDSCH transmissions that occur after the DCI activating the SPS configuration. For example, in some aspects, the base station may be deployed in a wireless network where dynamic antenna adaptation is enabled for SPS PDSCH communications, or one or more wireless communication standards may specify that dynamic antenna adaptation may be enabled for SPS PDSCH communications. Additionally, or alternatively, the UE may transmit capability information to the base station to indicate whether the UE supports dynamic antenna adaptation for SPS traffic, where the capability may be UE-specific (e.g., based on a configuration of the UE) or band-specific (e.g., the UE may have a capability to support dynamic antenna adaptation for SPS traffic in certain bands and may not support dynamic antenna adaptation for SPS traffic in other bands). In such cases, dynamic antenna adaptation may be enabled for SPS traffic based on the capability information provided by the UE (e.g., dynamic antenna adaptation may be enabled for SPS traffic based on the UE supporting dynamic antenna adaptation for SPS and/or based on the UE and the base station communicating in a band in which the UE supports dynamic antenna adaptation for SPS).

In general, when dynamic antenna adaptation is not enabled for SPS traffic, the UE does not expect dynamic antenna adaptation to be configured for any SPS PDSCH transmitted in an SPS occasion following the SPS activation indication unless a subsequent message is received to indicate updated SPS PDSCH transmission parameters, as described in more detail below. For example, as shown by reference number 730, the UE may monitor each scheduled SPS occasion, beginning with a next scheduled SPS occasion subsequent to the DCI carrying the SPS activation indication, to decode SPS PDSCH communications using the transmission parameters that were indicated in the SPS activation indication (e.g., a CSI report configuration, an SPS configuration, a number of DMRS antenna ports, an MCS, and/or other scheduling information in the DCI triggering or otherwise activating the SPS configuration may be used to decode the SPS PDSCH communications).

However, in cases where the base station performs dynamic antenna adaptation (e.g., based on a current or predicted cell load) and dynamic antenna adaptation is enabled for SPS traffic, the base station may transmit a message to update one or more SPS PDSCH transmission parameters based on the current antenna configuration (e.g., an updated CSI report configuration, an updated SPS configuration, an updated number of DMRS ports, an updated MCS, and/or other updated scheduling information, which may generally depend on which antenna panels, antenna sub-panels, and/or antenna ports are currently active). For example, as shown by reference number 740, the base station may transmit, and the UE may receive, a medium access control (MAC) control element (MAC-CE) or DCI to indicate one or more updated SPS PDSCH transmission parameters that are based on the dynamic antenna adaptation. Accordingly, as shown by reference number 750, the UE may then monitor subsequent SPS PDSCH occasions to decode subsequent SPS PDSCH transmissions using the updated SPS PDSCH transmission parameters indicated in the MAC-CE or DCI.

In some aspects, in cases where the updated SPS PDSCH transmission parameters are indicated in a MAC-CE, the updated SPS PDSCH transmission parameters may be included in a MAC-CE that indicates an updated channel state information (CSI) report configuration (e.g., a CSI codebook configuration, which may include an antenna configuration that is configured as part of the CSI codebook configuration). Additionally, or alternatively, the updated transmission parameters may be included in a MAC-CE that indicates an updated SPS configuration, an updated DMRS antenna ports configuration, and/or an updated MCS configuration, among other examples.

Alternatively, in cases where DCI is used to indicate the one or more updated SPS PDSCH transmission parameters based on the dynamic antenna adaptation, the base station may need to transmit an additional PDCCH in addition to the DCI that activates the SPS configuration and the DCI that eventually deactivates or releases the SPS configuration. For example, as shown in FIGS. 7B-7C, reference number 760 depicts a PDCCH configuration that may be used for SPS activation and release, where the UE may generally monitor each PDCCH occasion associated with SPS activation and release to determine whether an SPS configuration has been activated or released. For example, in FIGS. 7B-7C, reference number 770 depicts a PDCCH monitoring occasion where the UE detects the DCI that carries the SPS activation indication, which causes the UE to start to monitor SPS PDSCH occasions for SPS PDSCH transmissions from the base station without the base station having to transmit an additional PDCCH. However, the UE may continue to monitor the PDCCH occasions associated with the SPS activation and release to determine whether the (activated) SPS configuration has been released. For example, in FIGS. 7B-7C, reference number 780 depicts a PDCCH monitoring occasion where the UE detects a PDCCH that carries DCI indicating that the SPS configuration has been released, whereby the SPS configuration may generally be active between the PDCCH monitoring occasion where the DCI carrying the SPS activation indication is detected and the PDCCH monitoring occasion where the DCI carrying the SPS release indication is detected. Accordingly, in cases where dynamic antenna adaptation is enabled for SPS traffic and DCI is used to indicate the updated SPS PDSCH transmission parameters after a dynamic antenna adaptation event (e.g., where the base station turns one or more antenna panels, sub-panels, or ports on or off), the additional PDCCH that indicates the updated SPS PDSCH transmission parameters may be transmitted between the PDCCH monitoring occasion where the DCI carrying the SPS activation indication is detected and the PDCCH monitoring occasion where the DCI carrying the SPS release indication is detected.

For example, in FIG. 7B, reference number 790-1 depicts a scenario where the PDCCH that indicates the updated SPS PDSCH transmission parameters shares a PDCCH configuration with the PDCCH used to indicate the SPS activation or release (e.g., is transmitted in a PDCCH occupying the same frequency and time resources as the PDCCH used to indicate the SPS activation or release). In this case, the UE may continue to monitor the PDCCH occasions associated with the SPS activation or release in order to detect updated SPS PDSCH transmission parameters associated with a dynamically adapted antenna configuration (e.g., an updated CSI report configuration that may include an updated antenna configuration associated with a codebook configuration, an updated SPS configuration, an updated DMRS antenna ports configuration, and/or an updated MCS, among other examples). For example, the UE may interpret content of the DCI that is transmitted in the PDCCH monitoring occasions differently depending on whether the DCI carries an SPS activation indication, an SPS release indication, or an SPS PDSCH configuration update, where one or more fields in the DCI may be used to differentiate between the DCI carrying an SPS activation indication, an SPS release indication, or an SPS PDSCH configuration update. Alternatively, in FIG. 7C, reference number 790-2 depicts a scenario where the PDCCH that indicates the updated transmission parameters has a PDCCH configuration that is separate from the PDCCH used to indicate the SPS activation or release (e.g., is transmitted in a PDCCH occupying different frequency and/or time resources than the PDCCH used to indicate the SPS activation or release). In this case, in addition to monitoring the PDCCH occasions associated with the SPS activation or release (e.g., to determine whether the activated SPS configuration has been released), the UE may monitor the PDCCH occasions where the base station may transmit the DCI used to indicate the updated SPS transmission parameters that are based on the dynamic antenna adaptation (e.g., updated MCS and/or number of antenna ports). In some aspects, the DCI that is used to indicate the updated SPS transmission parameters based on the dynamic antenna adaptation may be associated with a UE group to save signaling overhead.

As indicated above, FIGS. 7A-7C are provided as examples. Other examples may differ from what is described with regard to FIGS. 7A-7C.

Figure 8:
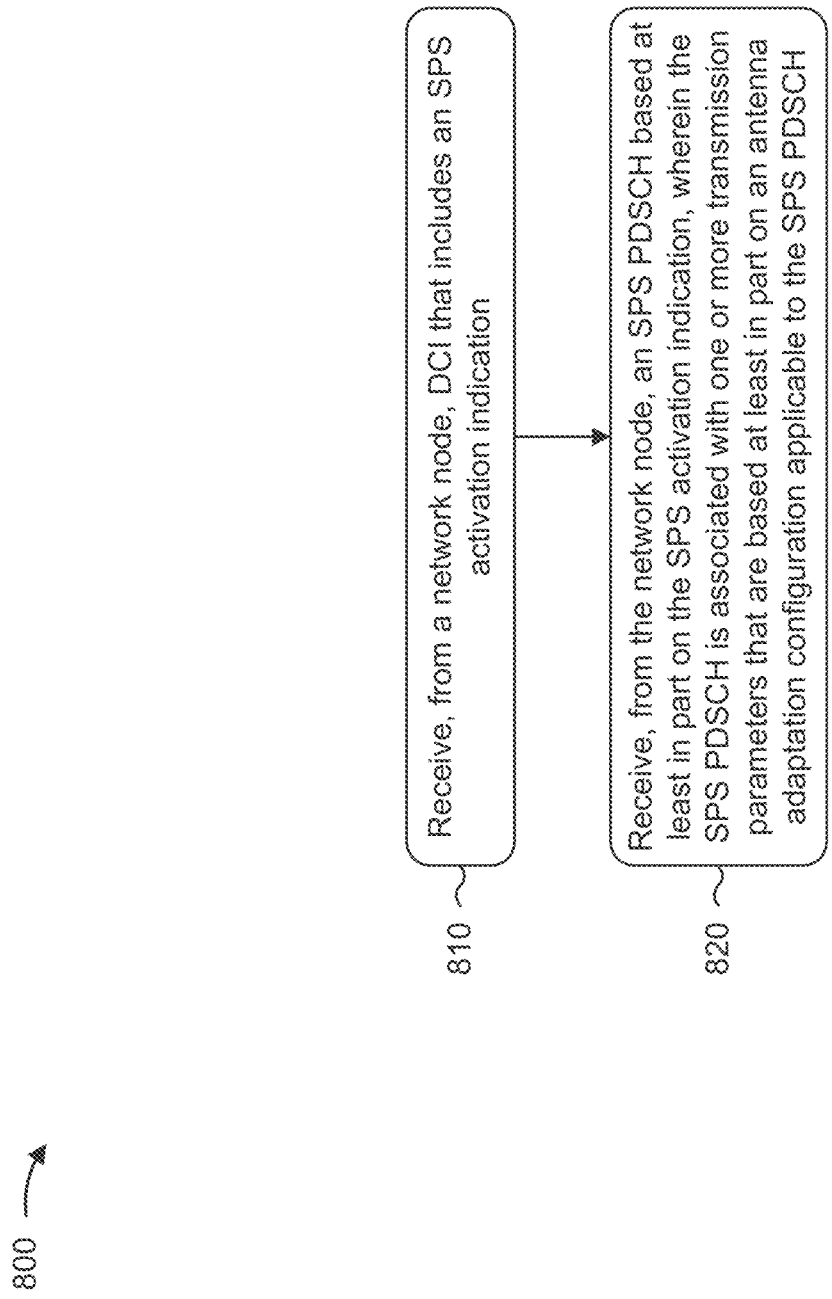
FIGS. 8-9 are diagrams illustrating example processes associated with dynamic network-side antenna adaptation for SPS downlink traffic, in accordance with the present disclosure.

FIG. 8 is a diagram illustrating an example process 800 performed, for example, by a UE, in accordance with the present disclosure. Example process 800 is an example where the UE (e.g., UE 120) performs operations associated with dynamic network-side antenna adaptation for SPS downlink traffic.

As shown in FIG. 8, in some aspects, process 800 may include receiving, from a network node, DCI that includes an SPS activation indication (block 810). For example, the UE (e.g., using communication manager 140 and/or reception component 1002, depicted in FIG. 10) may receive, from a network node, DCI that includes an SPS activation indication, as described above.

As further shown in FIG. 8, in some aspects, process 800 may include receiving, from the network node, an SPS PDSCH based at least in part on the SPS activation indication, wherein the SPS PDSCH is associated with one or more transmission parameters that are based at least in part on an antenna adaptation configuration applicable to the SPS PDSCH (block 820). For example, the UE (e.g., using communication manager 140 and/or reception component 1002, depicted in FIG. 10) may receive, from the network node, an SPS PDSCH based at least in part on the SPS activation indication, wherein the SPS PDSCH is associated with one or more transmission parameters that are based at least in part on an antenna adaptation configuration applicable to the SPS PDSCH, as described above.

Process 800 may include additional aspects, such as any single aspect or any combination of aspects described below and/or in connection with one or more other processes described elsewhere herein.

In a first aspect, the antenna adaptation configuration disables dynamic antenna adaptation for the SPS PDSCH.

In a second aspect, alone or in combination with the first aspect, the one or more transmission parameters associated with the SPS PDSCH are indicated in the DCI that includes the SPS activation indication based at least in part on the antenna adaptation configuration disabling dynamic antenna adaptation for the SPS PDSCH.

In a third aspect, alone or in combination with one or more of the first and second aspects, process 800 includes receiving, after the DCI that includes the SPS activation indication and prior to the SPS PDSCH, a MAC-CE that indicates the one or more transmission parameters based at least in part on the antenna adaptation configuration enabling dynamic antenna adaptation for the SPS PDSCH.

In a fourth aspect, alone or in combination with one or more of the first through third aspects, the MAC-CE indicates the one or more transmission parameters in an update to one or more of a CSI report configuration, an SPS configuration, a DMRS antenna port configuration, or an MCS.

In a fifth aspect, alone or in combination with one or more of the first through fourth aspects, process 800 includes receiving, after the DCI that includes the SPS activation indication, a subsequent DCI that indicates the one or more transmission parameters associated with the SPS PDSCH based at least in part on the antenna adaptation configuration enabling dynamic antenna adaptation for the SPS PDSCH.

In a sixth aspect, alone or in combination with one or more of the first through fifth aspects, the subsequent DCI that indicates the one or more transmission parameters associated with the SPS PDSCH is received in a PDCCH monitoring occasion that shares a PDCCH configuration with the DCI that includes the SPS activation indication.

In a seventh aspect, alone or in combination with one or more of the first through sixth aspects, process 800 includes interpreting the subsequent DCI to determine the one or more transmission parameters associated with the SPS PDSCH according to the antenna adaptation configuration.

In an eighth aspect, alone or in combination with one or more of the first through seventh aspects, the subsequent DCI that indicates the one or more transmission parameters associated with the SPS PDSCH includes one or more fields to indicate that the DCI is associated with a dynamic update to an antenna configuration.

In a ninth aspect, alone or in combination with one or more of the first through eighth aspects, the subsequent DCI that indicates the one or more transmission parameters associated with the SPS PDSCH is received in a PDCCH monitoring occasion associated with a PDCCH configuration that differs from a PDCCH configuration associated with the DCI that includes the SPS activation indication.

In a tenth aspect, alone or in combination with one or more of the first through ninth aspects, the subsequent DCI that indicates the one or more transmission parameters associated with the SPS PDSCH is associated with a UE group.

In an eleventh aspect, alone or in combination with one or more of the first through tenth aspects, process 800 includes transmitting, to the network node, information that indicates a capability to support dynamic antenna adaptation for the SPS PDSCH, wherein the antenna adaptation configuration applicable to the SPS PDSCH is based at least in part on the capability to support dynamic antenna adaptation for the SPS PDSCH.

In a twelfth aspect, alone or in combination with one or more of the first through eleventh aspects, the capability to support dynamic antenna adaptation for the SPS PDSCH is based at least in part on one or more of a configuration associated with the UE or a band associated with the SPS PDSCH.

In a thirteenth aspect, alone or in combination with one or more of the first through twelfth aspects, the one or more transmission parameters that are based at least in part on the antenna adaptation configuration applicable to the SPS PDSCH include a CSI report configuration, an SPS configuration, an antenna ports configuration for a DMRS, or an MCS.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
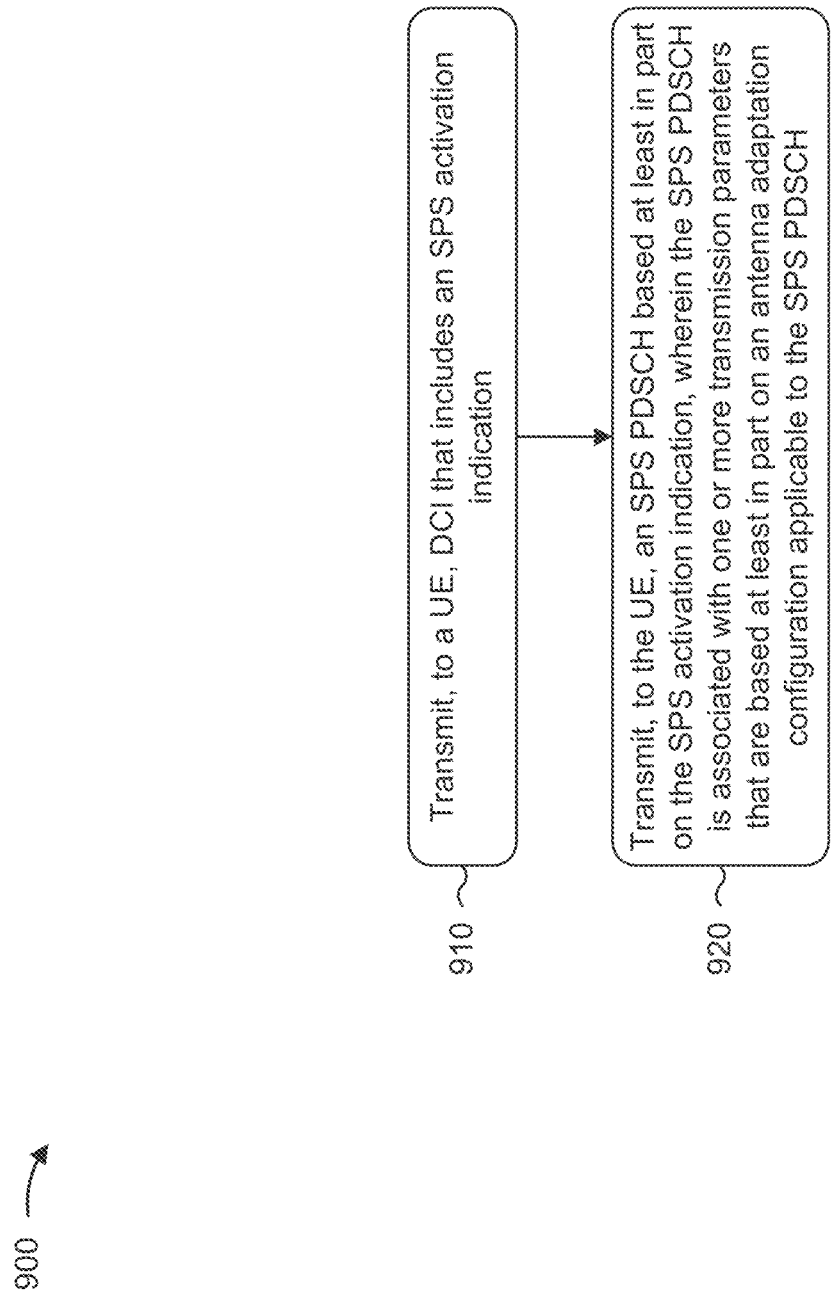

FIG. 9 is a diagram illustrating an example process 900 performed, for example, by a network node, in accordance with the present disclosure. Example process 900 is an example where the network node (e.g., base station 110) performs operations associated with dynamic network-side antenna adaptation for SPS downlink traffic.

As shown in FIG. 9, in some aspects, process 900 may include transmitting, to a UE, DCI that includes an SPS activation indication (block 910). For example, the network node (e.g., using communication manager 150 and/or transmission component 1104, depicted in FIG. 11) may transmit, to a UE, DCI that includes an SPS activation indication, as described above.

As further shown in FIG. 9, in some aspects, process 900 may include transmitting, to the UE, an SPS PDSCH based at least in part on the SPS activation indication, wherein the SPS PDSCH is associated with one or more transmission parameters that are based at least in part on an antenna adaptation configuration applicable to the SPS PDSCH (block 920). For example, the network node (e.g., using communication manager 150 and/or transmission component 1104, depicted in FIG. 11) may transmit, to the UE, an SPS PDSCH based at least in part on the SPS activation indication, wherein the SPS PDSCH is associated with one or more transmission parameters that are based at least in part on an antenna adaptation configuration applicable to the SPS PDSCH, as described above.

Process 900 may include additional aspects, such as any single aspect or any combination of aspects described below and/or in connection with one or more other processes described elsewhere herein.

In a first aspect, the antenna adaptation configuration disables dynamic antenna adaptation for the SPS PDSCH.

In a second aspect, alone or in combination with the first aspect, the one or more transmission parameters associated with the SPS PDSCH are indicated in the DCI that includes the SPS activation indication based at least in part on the antenna adaptation configuration disabling dynamic antenna adaptation for the SPS PDSCH.

In a third aspect, alone or in combination with one or more of the first and second aspects, process 900 includes transmitting, after the DCI that includes the SPS activation indication and prior to the SPS PDSCH, a MAC-CE that indicates the one or more transmission parameters based at least in part on the antenna adaptation configuration enabling dynamic antenna adaptation for the SPS PDSCH.

In a fourth aspect, alone or in combination with one or more of the first through third aspects, the MAC-CE indicates the one or more transmission parameters in an update to one or more of a CSI report configuration, an SPS configuration, a DMRS antenna port configuration, or an MCS.

In a fifth aspect, alone or in combination with one or more of the first through fourth aspects, process 900 includes transmitting, after the DCI that includes the SPS activation indication, a subsequent DCI that indicates the one or more transmission parameters associated with the SPS PDSCH based at least in part on the antenna adaptation configuration enabling dynamic antenna adaptation for the SPS PDSCH.

In a sixth aspect, alone or in combination with one or more of the first through fifth aspects, the subsequent DCI that indicates the one or more transmission parameters associated with the SPS PDSCH is transmitted in a PDCCH monitoring occasion that shares a PDCCH configuration with the DCI that includes the SPS activation indication.

In a seventh aspect, alone or in combination with one or more of the first through sixth aspects, content in the subsequent DCI indicates the one or more transmission parameters associated with the SPS PDSCH according to the antenna adaptation configuration.

In an eighth aspect, alone or in combination with one or more of the first through seventh aspects, the subsequent DCI that indicates the one or more transmission parameters associated with the SPS PDSCH includes one or more fields to indicate that the DCI is associated with a dynamic update to an antenna configuration.

In a ninth aspect, alone or in combination with one or more of the first through eighth aspects, the subsequent DCI that indicates the one or more transmission parameters associated with the SPS PDSCH is transmitted in a PDCCH monitoring occasion associated with a PDCCH configuration that differs from a PDCCH configuration associated with the DCI that includes the SPS activation indication.

In a tenth aspect, alone or in combination with one or more of the first through ninth aspects, the subsequent DCI that indicates the one or more transmission parameters associated with the SPS PDSCH is associated with a UE group.

In an eleventh aspect, alone or in combination with one or more of the first through tenth aspects, process 900 includes receiving, from the UE, information that indicates a capability to support dynamic antenna adaptation for the SPS PDSCH, wherein the antenna adaptation configuration applicable to the SPS PDSCH is based at least in part on the capability to support dynamic antenna adaptation for the SPS PDSCH.

In a twelfth aspect, alone or in combination with one or more of the first through eleventh aspects, the capability to support dynamic antenna adaptation for the SPS PDSCH is based at least in part on one or more of a configuration associated with the UE or a band associated with the SPS PDSCH.

In a thirteenth aspect, alone or in combination with one or more of the first through twelfth aspects, the one or more transmission parameters that are based at least in part on the antenna adaptation configuration applicable to the SPS PDSCH include a CSI report configuration, an SPS configuration, an antenna ports configuration for a DMRS, or an MCS.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
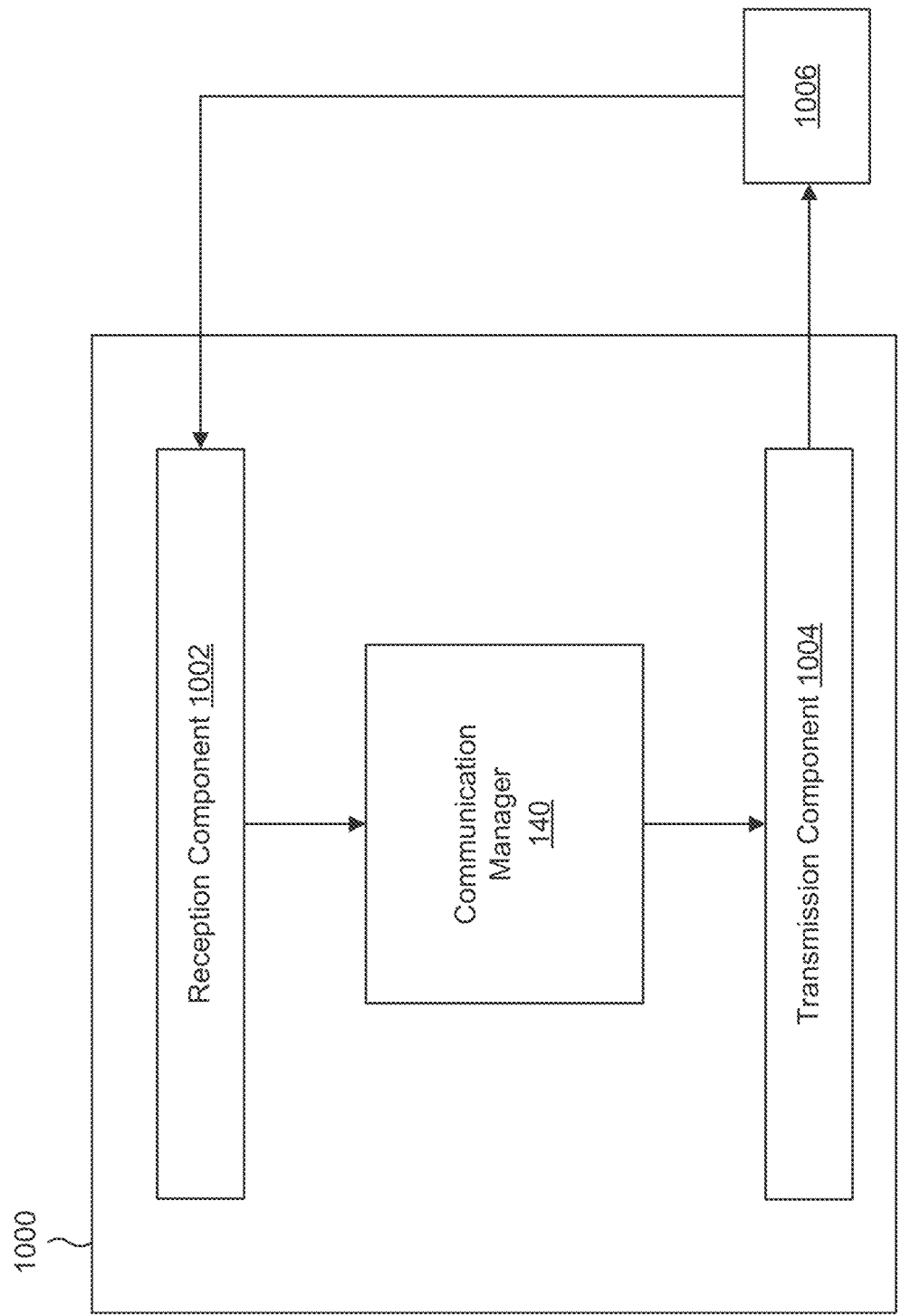
FIGS. 10-11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140.

In some aspects, the apparatus 1000 may be configured to perform one or more operations described herein in connection with FIG. 6 and/or FIGS. 7A-7C. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from a network node, DCI that includes an SPS activation indication. The reception component 1002 may receive, from the network node, an SPS PDSCH based at least in part on the SPS activation indication, wherein the SPS PDSCH is associated with one or more transmission parameters that are based at least in part on an antenna adaptation configuration applicable to the SPS PDSCH.

The reception component 1002 may receive, after the DCI that includes the SPS activation indication and prior to the SPS PDSCH, a MAC-CE that indicates the one or more transmission parameters based at least in part on the antenna adaptation configuration enabling dynamic antenna adaptation for the SPS PDSCH.

The reception component 1002 may receive, after the DCI that includes the SPS activation indication, a subsequent DCI that indicates the one or more transmission parameters associated with the SPS PDSCH based at least in part on the antenna adaptation configuration enabling dynamic antenna adaptation for the SPS PDSCH.

The communication manager 140 may interpret the subsequent DCI to determine the one or more transmission parameters associated with the SPS PDSCH according to the antenna adaptation configuration.

The transmission component 1004 may transmit, to the network node, information that indicates a capability to support dynamic antenna adaptation for the SPS PDSCH, wherein the antenna adaptation configuration applicable to the SPS PDSCH is based at least in part on the capability to support dynamic antenna adaptation for the SPS PDSCH.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
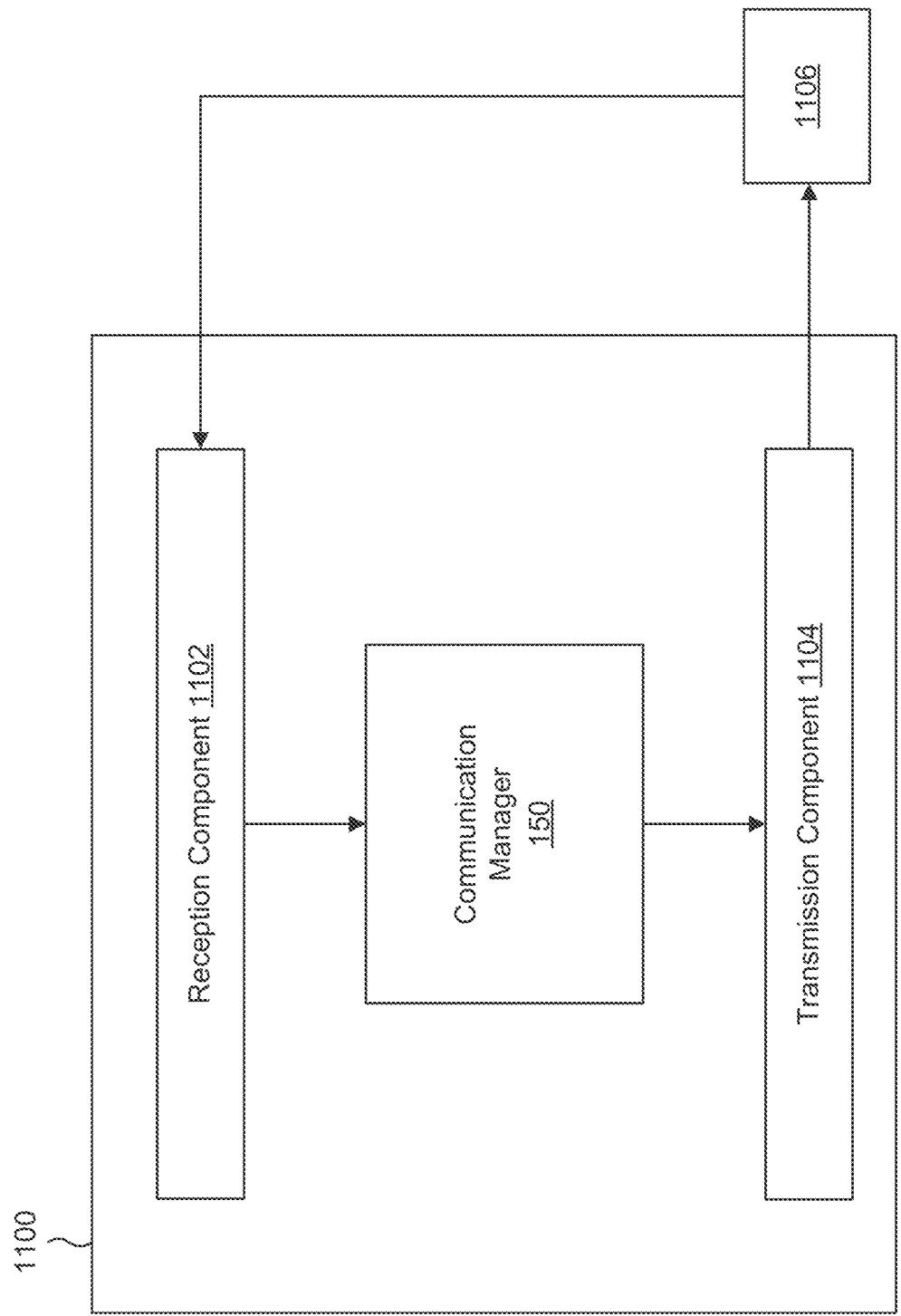

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104.

As further shown, the apparatus 1100 may include the communication manager 150.

In some aspects, the apparatus 1100 may be configured to perform one or more operations described herein in connection with FIG. 6 and/or FIGS. 7A-7C. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit, to a UE, DCI that includes an SPS activation indication. The transmission component 1104 may transmit, to the UE, an SPS PDSCH based at least in part on the SPS activation indication, wherein the SPS PDSCH is associated with one or more transmission parameters that are based at least in part on an antenna adaptation configuration applicable to the SPS PDSCH.

The transmission component 1104 may transmit, after the DCI that includes the SPS activation indication and prior to the SPS PDSCH, a MAC-CE that indicates the one or more transmission parameters based at least in part on the antenna adaptation configuration enabling dynamic antenna adaptation for the SPS PDSCH.

The transmission component 1104 may transmit, after the DCI that includes the SPS activation indication, a subsequent DCI that indicates the one or more transmission parameters associated with the SPS PDSCH based at least in part on the antenna adaptation configuration enabling dynamic antenna adaptation for the SPS PDSCH.

The reception component 1102 may receive, from the UE, information that indicates a capability to support dynamic antenna adaptation for the SPS PDSCH, wherein the antenna adaptation configuration applicable to the SPS PDSCH is based at least in part on the capability to support dynamic antenna adaptation for the SPS PDSCH.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a UE, comprising: receiving, from a network node, DCI that includes an SPS activation indication; and receiving, from the network node, an SPS PDSCH based at least in part on the SPS activation indication, wherein the SPS PDSCH is associated with one or more transmission parameters that are based at least in part on an antenna adaptation configuration applicable to the SPS PDSCH.

Aspect 2: The method of Aspect 1, wherein the antenna adaptation configuration disables dynamic antenna adaptation for the SPS PDSCH.

Aspect 3: The method of any of Aspects 1-2, wherein the one or more transmission parameters associated with the SPS PDSCH are indicated in the DCI that includes the SPS activation indication based at least in part on the antenna adaptation configuration disabling dynamic antenna adaptation for the SPS PDSCH.

Aspect 4: The method of Aspect 1, further comprising: receiving, after the DCI that includes the SPS activation indication and prior to the SPS PDSCH, a MAC-CE that indicates the one or more transmission parameters based at least in part on the antenna adaptation configuration enabling dynamic antenna adaptation for the SPS PDSCH.

Aspect 5: The method of Aspect 4, wherein the MAC-CE indicates the one or more transmission parameters in an update to one or more of a CSI report configuration, an SPS configuration, a DMRS antenna port configuration, or an MCS.

Aspect 6: The method of Aspect 1, further comprising: receiving, after the DCI that includes the SPS activation indication, a subsequent DCI that indicates the one or more transmission parameters associated with the SPS PDSCH based at least in part on the antenna adaptation configuration enabling dynamic antenna adaptation for the SPS PDSCH.

Aspect 7: The method of Aspect 6, wherein the subsequent DCI that indicates the one or more transmission parameters associated with the SPS PDSCH is received in a PDCCH monitoring occasion that shares a PDCCH configuration with the DCI that includes the SPS activation indication.

Aspect 8: The method of Aspect 7, further comprising: interpreting the subsequent DCI to determine the one or more transmission parameters associated with the SPS PDSCH according to the antenna adaptation configuration.

Aspect 9: The method of any of Aspects 7-8, wherein the subsequent DCI that indicates the one or more transmission parameters associated with the SPS PDSCH includes one or more fields to indicate that the DCI is associated with a dynamic update to an antenna configuration.

Aspect 10: The method of Aspect 6, wherein the subsequent DCI that indicates the one or more transmission parameters associated with the SPS PDSCH is received in a PDCCH monitoring occasion associated with a PDCCH configuration that differs from a PDCCH configuration associated with the DCI that includes the SPS activation indication.

Aspect 11: The method of Aspect 10, wherein the subsequent DCI that indicates the one or more transmission parameters associated with the SPS PDSCH is associated with a UE group.

Aspect 12: The method of any of Aspects 1-11, further comprising: transmitting, to the network node, information that indicates a capability to support dynamic antenna adaptation for the SPS PDSCH, wherein the antenna adaptation configuration applicable to the SPS PDSCH is based at least in part on the capability to support dynamic antenna adaptation for the SPS PDSCH.

Aspect 13: The method of Aspect 12, wherein the capability to support dynamic antenna adaptation for the SPS PDSCH is based at least in part on one or more of a configuration associated with the UE or a band associated with the SPS PDSCH.

Aspect 14: The method of any of Aspects 1-13, wherein the one or more transmission parameters that are based at least in part on the antenna adaptation configuration applicable to the SPS PDSCH include a CSI report configuration, an SPS configuration, an antenna ports configuration for a DMRS, or an MCS.

Aspect 15: A method of wireless communication performed by a network node, comprising: transmitting, to a UE, DCI that includes an SPS activation indication; and transmitting, to the UE, an SPS PDSCH based at least in part on the SPS activation indication, wherein the SPS PDSCH is associated with one or more transmission parameters that are based at least in part on an antenna adaptation configuration applicable to the SPS PDSCH.

Aspect 16: The method of Aspect 15, wherein the antenna adaptation configuration disables dynamic antenna adaptation for the SPS PDSCH.

Aspect 17: The method of any of Aspects 15-16, wherein the one or more transmission parameters associated with the SPS PDSCH are indicated in the DCI that includes the SPS activation indication based at least in part on the antenna adaptation configuration disabling dynamic antenna adaptation for the SPS PDSCH.

Aspect 18: The method of Aspect 15, further comprising: transmitting, after the DCI that includes the SPS activation indication and prior to the SPS PDSCH, a MAC-CE that indicates the one or more transmission parameters based at least in part on the antenna adaptation configuration enabling dynamic antenna adaptation for the SPS PDSCH.

Aspect 19: The method of Aspect 18, wherein the MAC-CE indicates the one or more transmission parameters in an update to one or more of a CSI report configuration, an SPS configuration, a DMRS antenna port configuration, or an MCS.

Aspect 20: The method of Aspect 15, further comprising: transmitting, after the DCI that includes the SPS activation indication, a subsequent DCI that indicates the one or more transmission parameters associated with the SPS PDSCH based at least in part on the antenna adaptation configuration enabling dynamic antenna adaptation for the SPS PDSCH.

Aspect 21: The method of Aspect 20, wherein the subsequent DCI that indicates the one or more transmission parameters associated with the SPS PDSCH is transmitted in a PDCCH monitoring occasion that shares a PDCCH configuration with the DCI that includes the SPS activation indication.

Aspect 22: The method of Aspect 21, wherein content in the subsequent DCI indicates the one or more transmission parameters associated with the SPS PDSCH according to the antenna adaptation configuration.

Aspect 23: The method of any of Aspects 21-22, wherein the subsequent DCI that indicates the one or more transmission parameters associated with the SPS PDSCH includes one or more fields to indicate that the DCI is associated with a dynamic update to an antenna configuration.

Aspect 24: The method of Aspect 20, wherein the subsequent DCI that indicates the one or more transmission parameters associated with the SPS PDSCH is transmitted in a PDCCH monitoring occasion associated with a PDCCH configuration that differs from a PDCCH configuration associated with the DCI that includes the SPS activation indication.

Aspect 25: The method of Aspect 24, wherein the subsequent DCI that indicates the one or more transmission parameters associated with the SPS PDSCH is associated with a UE group.

Aspect 26: The method of any of Aspects 15-25, further comprising: receiving, from the UE, information that indicates a capability to support dynamic antenna adaptation for the SPS PDSCH, wherein the antenna adaptation configuration applicable to the SPS PDSCH is based at least in part on the capability to support dynamic antenna adaptation for the SPS PDSCH.

Aspect 27: The method of Aspect 26, wherein the capability to support dynamic antenna adaptation for the SPS PDSCH is based at least in part on one or more of a configuration associated with the UE or a band associated with the SPS PDSCH.

Aspect 28: The method of any of Aspects 15-27, wherein the one or more transmission parameters that are based at least in part on the antenna adaptation configuration applicable to the SPS PDSCH include a CSI report configuration, an SPS configuration, an antenna ports configuration for a DMRS, or an MCS.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving, from a network node, a semi-persistent scheduling (SPS) configuration, wherein the SPS configuration is associated with an antenna adaptation configuration applicable to at least one SPS physical downlink shared channel (PDSCH), the antenna adaptation configuration disabling dynamic antenna adaptation for the at least one SPS PDSCH;
receiving, from the network node, downlink control information (DCI) that includes an SPS activation indication to activate the SPS configuration for the UE; and
receiving, from the network node, the at least one SPS PDSCH based at least in part on the SPS activation indication, wherein the at least one SPS PDSCH is associated with one or more transmission parameters that are based at least in part on the antenna adaptation configuration.

2. The method of claim 1, wherein the one or more transmission parameters associated with the at least one SPS PDSCH are indicated in the DCI that includes the SPS activation indication.

3. The method of claim 1, further comprising:
receiving, after the DCI that includes the SPS activation indication and prior to the at least one SPS PDSCH, a medium access control (MAC) control element (MAC-CE) that indicates the one or more transmission parameters.

4. The method of claim 1, further comprising:
receiving, after the DCI that includes the SPS activation indication, a subsequent DCI that indicates the one or more transmission parameters associated with the at least one SPS PDSCH based at least in part on the antenna adaptation configuration.

5. The method of claim 4, wherein the subsequent DCI that indicates the one or more transmission parameters associated with the at least one SPS PDSCH is received in a physical downlink control channel (PDCCH) monitoring occasion that shares a PDCCH configuration with the DCI that includes the SPS activation indication.

6. The method of claim 5, further comprising:
interpreting the subsequent DCI to determine the one or more transmission parameters associated with the at least one SPS PDSCH according to the antenna adaptation configuration.

7. The method of claim 5, wherein the subsequent DCI that indicates the one or more transmission parameters associated with the at least one SPS PDSCH includes one or more fields to indicate that the DCI is associated with a dynamic update to an antenna configuration.

8. The method of claim 4, wherein the subsequent DCI that indicates the one or more transmission parameters associated with the at least one SPS PDSCH is received in a physical downlink control channel (PDCCH) monitoring occasion associated with a PDCCH configuration that differs from a PDCCH configuration associated with the DCI that includes the SPS activation indication.

9. The method of claim 8, wherein the subsequent DCI that indicates the one or more transmission parameters associated with the at least one SPS PDSCH is associated with a UE group.

10. The method of claim 1, further comprising:
transmitting, to the network node, information that indicates a capability to support dynamic antenna adaptation for the at least one SPS PDSCH based at least in part on one or more of a configuration associated with the UE or a band associated with the at least one SPS PDSCH, wherein the antenna adaptation configuration is based at least in part on the capability to support dynamic antenna adaptation for the at least one SPS PDSCH.

11. The method of claim 1, wherein the one or more transmission parameters include a channel state information report configuration, an updated SPS configuration, an antenna ports configuration for a demodulation reference signal, or a modulation and coding scheme.

12. A method of wireless communication performed by a network node, comprising:
transmitting, to a user equipment (UE), a semi-persistent scheduling (SPS) configuration, wherein the SPS configuration is associated with an antenna adaptation configuration applicable to at least one SPS physical downlink shared channel (PDSCH), the antenna adaptation configuration disabling dynamic antenna adaptation for the at least one SPS PDSCH;
transmitting, to the UE, downlink control information (DCI) that includes an SPS activation indication to activate the SPS configuration for the UE; and
transmitting, to the UE, the at least one SPS PDSCH based at least in part on the SPS activation indication, wherein the at least one SPS PDSCH is associated with one or more transmission parameters that are based at least in part on the antenna adaptation configuration.

13. The method of claim 12, wherein the one or more transmission parameters associated with the at least one SPS PDSCH are indicated in the DCI that includes the SPS activation indication.

14. The method of claim 12, further comprising:
transmitting, after the DCI that includes the SPS activation indication and prior to the at least one SPS PDSCH, a medium access control (MAC) control element (MAC-CE) that indicates the one or more transmission parameters.

15. The method of claim 12, further comprising:
transmitting, after the DCI that includes the SPS activation indication, a subsequent DCI that indicates the one or more transmission parameters associated with the at least one SPS PDSCH based at least in part on the antenna adaptation configuration.

16. The method of claim 15, wherein the subsequent DCI that indicates the one or more transmission parameters associated with the at least one SPS PDSCH is transmitted in a physical downlink control channel (PDCCH) monitoring occasion that shares a PDCCH configuration with the DCI that includes the SPS activation indication.

17. The method of claim 16, wherein content in the subsequent DCI indicates the one or more transmission parameters associated with the at least one SPS PDSCH according to the antenna adaptation configuration.

18. The method of claim 16, wherein the subsequent DCI that indicates the one or more transmission parameters associated with the at least one SPS PDSCH includes one or more fields to indicate that the DCI is associated with a dynamic update to an antenna configuration.

19. The method of claim 15, wherein the subsequent DCI that indicates the one or more transmission parameters associated with the at least one SPS PDSCH is transmitted in a physical downlink control channel (PDCCH) monitoring occasion associated with a PDCCH configuration that differs from a PDCCH configuration associated with the DCI that includes the SPS activation indication.

20. The method of claim 19, wherein the subsequent DCI that indicates the one or more transmission parameters associated with the at least one SPS PDSCH is associated with a UE group.

21. The method of claim 12, further comprising:
receiving, from the UE, information that indicates a capability to support dynamic antenna adaptation for the at least one SPS PDSCH based at least in part on one or more of a configuration associated with the UE or a band associated with the at least one SPS PDSCH, wherein the antenna adaptation configuration is based at least in part on the capability to support dynamic antenna adaptation for the at least one SPS PDSCH.

22. The method of claim 12, wherein the one or more transmission parameters include a channel state information report configuration, an updated SPS configuration, an antenna ports configuration for a demodulation reference signal, or a modulation and coding scheme.

23. A user equipment (UE) for wireless communication, comprising:
one or more memories; and
one or more processors, coupled to the one or more memories, which are configured, individually or in any combination, to:
receive, from a network node, a semi-persistent scheduling (SPS) configuration, wherein the SPS configuration is associated with an antenna adaptation configuration applicable to at least one SPS physical downlink shared channel (PDSCH), the antenna adaptation configuration disabling dynamic antenna adaptation for the at least one SPS PDSCH;
receive, from the network node, downlink control information (DCI) that includes an SPS activation indication to activate the SPS configuration for the UE; and
receive, from the network node, the at least one SPS PDSCH based at least in part on the SPS activation indication, wherein the at least one SPS PDSCH is associated with one or more transmission parameters that are based at least in part on the antenna adaptation configuration.

24. The UE of claim 23, wherein the one or more processors are further configured, individually or in any combination, to:
receive, after the DCI that includes the SPS activation indication and prior to the at least one SPS PDSCH, a medium access control (MAC) control element (MAC-CE) that indicates the one or more transmission parameters.

25. The UE of claim 23, wherein the one or more processors are further configured, individually or in any combination, to:
receive, after the DCI that includes the SPS activation indication, a subsequent DCI that indicates the one or more transmission parameters associated with the at least one SPS PDSCH based at least in part on the antenna adaptation configuration.

26. The UE of claim 25, wherein the subsequent DCI that indicates the one or more transmission parameters associated with the at least one SPS PDSCH is received in a physical downlink control channel (PDCCH) monitoring occasion that shares a PDCCH configuration with the DCI that includes the SPS activation indication.

27. The UE of claim 25, wherein the subsequent DCI that indicates the one or more transmission parameters associated with the at least one SPS PDSCH is received in a physical downlink control channel (PDCCH) monitoring occasion associated with a PDCCH configuration that differs from a PDCCH configuration associated with the DCI that includes the SPS activation indication.

28. A network node for wireless communication, comprising:
one or more memories; and
one or more processors, coupled to the one or more memories, which are configured, individually or in any combination, to:
transmit, to a user equipment (UE), a semi-persistent scheduling (SPS) configuration, wherein the SPS configuration is associated with an antenna adaptation configuration applicable to at least one SPS physical downlink shared channel (PDSCH), the antenna adaptation configuration disabling dynamic antenna adaptation for the at least one SPS PDSCH;
transmit, to the UE, downlink control information (DCI) that includes an SPS activation indication to active the SPS configuration for the UE; and
transmit, to the UE, the at least one SPS PDSCH based at least in part on the SPS activation indication, wherein the at least one SPS PDSCH is associated with one or more transmission parameters that are based at least in part on the antenna adaptation configuration.

29. The network node of claim 28, wherein the one or more transmission parameters associated with the at least one SPS PDSCH are indicated in the DCI that includes the SPS activation indication.

30. The network node of claim 28, wherein the one or more transmission parameters include a channel state information report configuration, an updated SPS configuration, an antenna ports configuration for a demodulation reference signal, or a modulation and coding scheme.

* * * * *